US009531935B2

(12) United States Patent
Niida

(10) Patent No.: US 9,531,935 B2
(45) Date of Patent: Dec. 27, 2016

(54) CAPTURING CONTROL APPARATUS, CAPTURING CONTROL METHOD AND PROGRAM

(71) Applicant: CANON KABUSHIKI KAISHA, Tokyo (JP)

(72) Inventor: Mitsuo Niida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 444 days.

(21) Appl. No.: 13/909,604

(22) Filed: Jun. 4, 2013

(65) Prior Publication Data

US 2013/0329067 A1  Dec. 12, 2013

(30) Foreign Application Priority Data

Jun. 12, 2012  (JP) .................................. 2012-132890

(51) Int. Cl.
H04N 5/225 (2006.01)
H04N 5/232 (2006.01)
H04N 5/228 (2006.01)

(52) U.S. Cl.
CPC ...... H04N 5/23203 (2013.01); H04N 5/23206 (2013.01)

(58) Field of Classification Search
CPC ............... G08B 13/19689; G08B 13/1963; H04N 5/2259; H04N 5/23216; H04N 5/23203; H04N 5/23206
USPC ............................ 348/211.99, 208.99, 208.3, 207.11,348/207.99, 373, 211.3, 211.9
See application file for complete search history.

(56) References Cited

U.S. PATENT DOCUMENTS 6,400,903 B1 *  6/2002  Conoval ............ H04N 5/23206
                                                348/E5.043
6,518,956 B1 *  2/2003  Sato ................... H04N 5/23293
                                                345/173
2004/0223191 A1 * 11/2004  Murata .................. H04N 7/181
                                                358/451

(Continued)

FOREIGN PATENT DOCUMENTS

JP       2008-153842 A       7/2008
JP  WO 2011083547 A1 *       7/2011 ............. G03B 17/18

OTHER PUBLICATIONS

International Preliminary Report on Patentability issued in corresponding International Application No. PCT/JP2013/066532 mailed on Dec. 24, 2014.

*Primary Examiner* — Sinh Tran
*Assistant Examiner* — Xi Wang
(74) *Attorney, Agent, or Firm* — Carter, DeLuca, Farrell & Schmidt, LLP

(57) ABSTRACT

It is an object to allow a shooting direction to be changed in a direction intended by a user. An apparatus includes: an acceptance unit configured to accept one of a first instruction to rotate a captured image by a predetermined angle and a second instruction to rotate a coordinate system by the predetermined angle, and to refuse the other of the first and second instructions; a processing unit configured to perform a first processing to rotate the captured image by the predetermined angle and to perform a second processing to rotate the coordinate system stored in a storage unit by the predetermined angle, in response to accepting the one of the first and second instructions; and a control unit configured to perform control of changing the shooting direction of a capturing unit.

17 Claims, 14 Drawing Sheets

(56) References Cited

U.S. PATENT DOCUMENTS

| | | | | |
|---|---|---|---|---|
| 2005/0036036 A1* | 2/2005 | Stevenson | ........ | G08B 13/19608 348/211.99 |
| 2006/0197843 A1* | 9/2006 | Yoshimatsu | ....... | H04N 5/23293 348/219.1 |
| 2007/0200933 A1* | 8/2007 | Watanabe | ........ | G08B 13/19643 348/211.11 |
| 2007/0268369 A1* | 11/2007 | Amano | .................... | H04N 7/18 348/207.99 |
| 2008/0198178 A1* | 8/2008 | Julin | ........................ | G06T 3/40 345/661 |
| 2008/0246847 A1* | 10/2008 | Suda | ...................... | H04N 5/232 348/207.11 |
| 2011/0149094 A1* | 6/2011 | Chen | .................. | H04N 5/23248 348/208.3 |

* cited by examiner

NORMAL RESPONSE

| DESTINATION ADDRESS | SOURCE ADDRESS | NORMAL RESPONSE |

ERROR RESPONSE

| DESTINATION ADDRESS | SOURCE ADDRESS | ERROR RESPONSE |

FIG. 5A

INSTRUCTION TO CHANGE CAPTURING RANGE

| DESTINATION ADDRESS | SOURCE ADDRESS | INSTRUCTION TO CHANGE CAPTURING RANGE | PAN COORDINATE (-1.0 TO +1.0) | TILT COORDINATE (-1.0 TO +1.0) | ZOOM COORDINATE (0.0 TO +1.0) |
|---|---|---|---|---|---|

FIG. 5B

INSTRUCTION TO CHANGE IMAGE ORIENTATION

| DESTINATION ADDRESS | SOURCE ADDRESS | INSTRUCTION TO CHANGE IMAGE ORIENTATION | IMAGE ORIENTATION (OFF = NORMAL DIRECTION / ON = INVERTED DIRECTION / AUTO = AUTOMATICALLY DETERMINED DIRECTION) |
|---|---|---|---|

FIG. 7

INSTRUCTION TO CHANGE COORDINATE DIRECTION

| DESTINATION ADDRESS | SOURCE ADDRESS | INSTRUCTION TO CHANGE COORDINATE DIRECTION | COORDINATE DIRECTION (OFF = NORMAL DIRECTION/ON = INVERTED DIRECTION/ AUTO = AUTOMATICALLY DETERMINED DIRECTION) |
|---|---|---|---|

FIG. 11
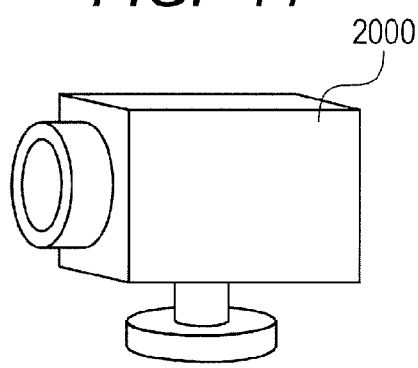
FIG. 12
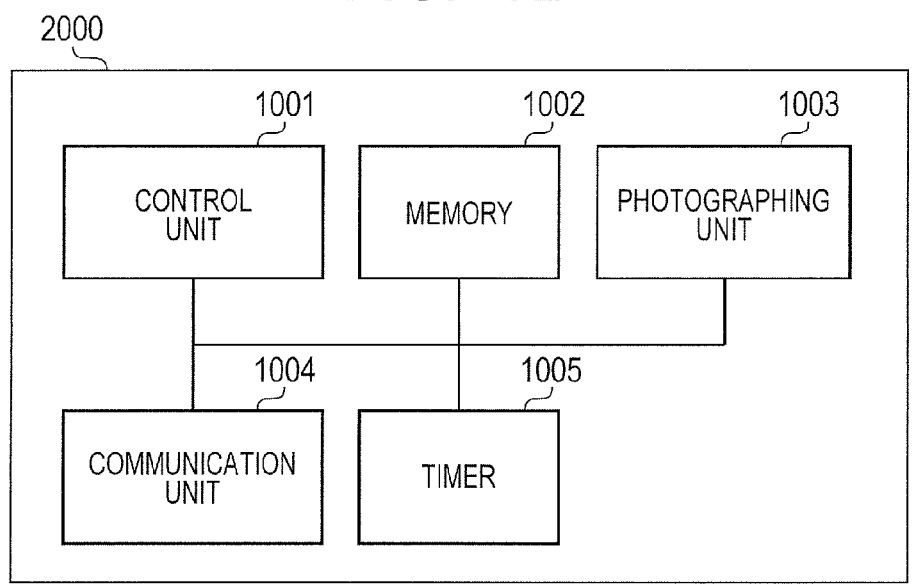
FIG. 13
TRIMMING RANGE COORDINATE (x1, y1)-(x2, y2)

FIG. 14A

```
<xs:complexType name="VideoSourceConfigurationExtension">
        <xs:sequence>
                <xs:element name="Rotate" type="tt:Rotate" minOccurs="0"/>
                <xs:element name="Extension"
                        type="tt:VideoSourceConfigurationExtension2" minOccurs="0"/>
        </xs:sequence>
</xs:complexType>
```

FIG. 14B

```
<xs:complexType name="Rotate">
        <xs:sequence>
                <xs:element name="Mode" type="tt:RotateMode"/>
                <xs:element name="Degree" type="xs:int" minOccurs="0"/>
                <xs:element name="Extension"
                        type="tt:RotateExtension" minOccurs="0"/>
        </xs:sequence>
        <xs:anyAttribute processContents="lax"/>
</xs:complexType>
```

FIG. 14C

```
<xs:simpleType name="RotateMode">
        <xs:restriction base="xs:string">
                <xs:enumeration value="OFF"/>
                <xs:enumeration value="ON"/>
                <xs:enumeration value="AUTO"/>
        </xs:restriction>
</xs:simpleType>
```

FIG. 14D

```
<xs:complexType name="PTControlDirection">
    <xs:sequence>
        <xs:element name="EFlip" type="tt:EFlip" minOccurs="0"/>
        <xs:element name="Reverse" type="tt:Reverse" minOccurs="0"/>
        <xs:element name="Extension"
            type="tt:PTControlDirectionExtension" minOccurs="0"/>
    </xs:sequence>
    <xs:anyAttribute processContents="lax"/>
</xs:complexType>
```

FIG. 14E

```
<xs:complexType name="Reverse">
    <xs:sequence>
        <xs:element name="Mode" type="tt:ReverseMode"/>
    </xs:sequence>
    <xs:anyAttribute processContents="lax"/>
</xs:complexType>
```

FIG. 14F

```
<xs:simpleType name="ReverseMode">
    <xs:restriction base="xs:string">
        <xs:enumeration value="OFF"/>
        <xs:enumeration value="ON"/>
        <xs:enumeration value="AUTO"/>
        <xs:enumeration value="Extended"/>
    </xs:restriction>
</xs:simpleType>
```

FIG. 15A

```
<SetConfiguration xmlns ="http://www.onvif.org/ver20/ptz/wsdl">
  <PTZConfiguration>
    <UseCount xsi:nil="true" xmlns="http://www.onvif.org/ver10/schema"/>
    <NodeToken xmlns="http://www.onvif.org/ver10/schema">0</NodeToken>
    <Extension xmlns="http://www.onvif.org/ver10/schema">
      <PTControlDirection >
        <Reverse>
          <Mode>ON</Mode>
        </Reverse>
      </PTControlDirection>
    </Extension>
  </PTZConfiguration>
  <ForcePersistence >false</ForcePersistence>
</SetConfiguration>
```

FIG. 15B

```
<SetVideoSourceConfiguration xmlns ="http://www.onvif.org/ver10/media/wsdl">
  <Configuration>
    <UseCount xsi:nil="true" xmlns="http://www.onvif.org/ver10/schema"/>
    <Extension xmlns="http://www.onvif.org/ver10/schema">
      <Rotate>
        <Mode>OFF</Mode>
      </Rotate>
    </Extension>
  </Configuration>
  <ForcePersistence>false</ForcePersistence>
</SetVideoSourceConfiguration>
```

CAPTURING CONTROL APPARATUS, CAPTURING CONTROL METHOD AND PROGRAM

BACKGROUND OF THE INVENTION

Field of the Invention

The present invention relates to a capturing control apparatus, a capturing control method and a recording medium.

Description of the Related Art

Conventionally, a capturing apparatus has been known that changes a shooting direction by moving a platform. Furthermore, a control apparatus has been known that changes the shooting direction according to a designation transmitted from a control apparatus connected to a capturing apparatus via a network. In the case of changing the installation situation of such a capturing apparatus, shooting directions of the capturing apparatus on the same instruction before and after the changing are different from each other.

As an example, the case is described of changing an installation state; the state is changed from a state where the capturing apparatus is arranged in an erect orientation into a state where the capturing apparatus is arranged in an inverted orientation, e.g., a state of being installed on a ceiling. When an instruction for changing upward the shooting direction of the capturing apparatus arranged in the erect orientation is issued to the capturing apparatus arranged in the inverted orientation, the capturing apparatus operates so as to change the shooting direction downward. In the case where the arrangement state of the capturing apparatus is thus changed from the erect orientation to the inverted orientation, the vertical and horizontal orientations with respect to the shooting directions of the capturing apparatus are reversed on the same instruction.

Japanese Patent Application Laid-Open No. 2008-153842 discloses a capturing system that stores a plurality of control programs for changing the shooting direction of a capturing apparatus and switches the control program to be used in conformity with the orientation in which the capturing apparatus is arranged. The capturing system switches the control program to thereby switch a coordinate system for representing the shooting direction in coordinates. The capturing apparatus can set the direction to a certain direction according to a specific instruction, regardless of the arrangement state.

When the control apparatus receives and displays a captured image captured by the capturing apparatus, change in arrangement state of the capturing apparatus affects the orientation of the captured image displayed by the control apparatus. Accordingly, it is desirable that the orientation of the captured image also be changed. For instance, when the arrangement state of the capturing apparatus is changed from an erect state to an inverted state, the vertical and horizontal orientations of the captured image displayed by the control apparatus are reversed. Thus, the captured image captured by the capturing apparatus in the inverted state is rotated by 180 degrees and displayed by the control apparatus, thereby allowing the captured image vertically and horizontally matching with a captured image in the erect state to be displayed.

Thus, the interface for changing the orientation of the captured image displayed by the control apparatus and the interface for changing the coordinate system for controlling the shooting direction are sometimes separately defined as instructions different from each other. In such a capturing apparatus, in the case of changing both of the orientation of the captured image displayed and the orientation of the coordinate system for controlling the shooting direction, the vertical and horizontal orientations of the captured image displayed sometimes differ from the vertical and horizontal orientations in the coordinate system. For instance, in the case where a first received one of the instructions to change the orientation of the captured image and the instruction to change the orientation of the coordinate system has been processed but the other instruction has not been processed, the orientation of the captured image does not match with the orientation of the coordinate system.

In this state, in the case where a user transmits, to the capturing apparatus, an instruction of changing the shooting direction while watching the captured image having been delivered, a platform unfortunately operates in a direction different from a direction expected by the user. An analogous problem is not limited to the case of rotating the orientation of the captured image or the orientation of the coordinate system by 180 degrees. Instead, the problem occurs in the case of rotating the orientation of the captured image or the orientation of the coordinates by any degrees.

The present invention is made in view of such problems. It is an object of the present invention to allow the shooting direction to be changed to a direction intended by the user.

SUMMARY OF THE INVENTION

According to an aspect of the present invention, provided is a transmitting apparatus for transmitting an image captured by a capturing unit to a receiving apparatus comprising: a storage unit configured to store a coordinate system for use in indicating a shooting direction of the capturing unit; a receiving unit configured to receive specifying information specifying the shooting direction on the coordinate system; an acceptance unit configured to accept one of a first instruction to rotate by a predetermined angle the image captured by the capturing unit and a second instruction to rotate by the predetermined angle the coordinate system stored in the storage unit, and to refuse the other of the first and second instructions; a processing unit configured to perform a first processing to rotate by the predetermined angle the captured image and to perform a second processing to rotate by the predetermined angle the coordinate system stored in the storage unit, in response to the accepting the one of the first and second instruction by the acceptance unit; and a control unit configured to control the shooting direction of the capturing unit to be brought into the shooting direction specified by the specifying information.

Further features of the present invention will become apparent from the following description of exemplary embodiments with reference to the attached drawings.

BRIEF DESCRIPTION OF THE DRAWINGS

FIG. 5A is a diagram illustrating an example of an instruction to change an image capturing range.

FIG. 5B is a diagram illustrating an example of an instruction to change an image orientation.

FIG. 7 is a diagram illustrating an example of an instruction to change a coordinate direction.

FIG. 11 is a diagram illustrating an example of a configuration of a capturing apparatus according to Embodiment 2.

FIG. 12 is a diagram illustrating an example of a hardware configuration of the capturing apparatus.

FIG. 13 is a diagram illustrating an example of trimming parameters.

FIG. 14A is a diagram illustrating an example of the normal response.

FIG. 14B is a diagram illustrating an example of the error response.

FIG. 14C is a diagram illustrating a definition of a Rotate Mode type.

FIG. 14D is a diagram illustrating a configuration of a PT Control Direction type used for an instruction to change the coordinate direction, and an instruction for a query about coordinate direction changing capability.

FIG. 14E is a diagram illustrating a definition of a Reverse type.

FIG. 14F is a diagram illustrating a definition of a Reverse Mode type.

FIG. 15A is a diagram illustrating a configuration of an instruction to change the coordinate direction (Set Configuration instruction) in the ON case.

FIG. 15B is a diagram illustrating an example of a configuration of an instruction to change the image orientation (Set Video Source Configuration instruction) where the value of a Mode field is set to OFF.

DESCRIPTION OF THE EMBODIMENTS

Preferred embodiments of the present invention will now be described in detail in accordance with the accompanying drawings.

Embodiment 1

Figure 1A:
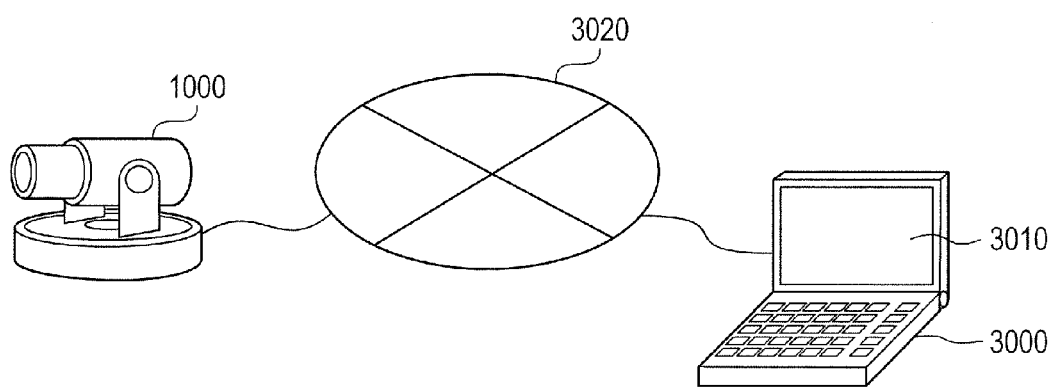
FIG. 1A is a diagram illustrating an example of a system configuration of a capturing system according to Embodiment 1.

FIG. 1A is a diagram illustrating an example of a system configuration of a capturing system according to Embodiment 1. In the capturing system according to Embodiment 1, a capturing apparatus 1000 is connected to a client 3000 via a network 3020 in a manner capable of communication. The capturing apparatus 1000 delivers a captured image to the client 3000 via the network 3020. The client 3000 is an example of an information processing apparatus.

The network 3020 includes routers, switches and cables that are in conformity with a communication standard, e.g., Ethernet (registered trademark). In this embodiment, any network allowing communication between the capturing apparatus 1000 and the client 3000 can be employed regardless of the communication standard, scale, and configuration. For instance, the network 3020 may be configured by the Internet, wired LAN (local area network), wireless LAN, or WAN (wide area network).

The client 3000 transmits an instruction to the capturing apparatus 1000. The client 3000 transmits an instruction to change the shooting direction or the angle of view of the capturing apparatus 1000. The client 3000 transmits an instruction for rotation around the origin with respect to a coordinate system used for representing the position in an image capturing range of the capturing apparatus 1000. Furthermore, the client 3000 includes a display 3010 on which a captured image captured by the capturing apparatus 1000 is displayed, and transmits an instruction to rotate the captured image displayed on the display 3010 with respect to the capturing apparatus 1000.

The capturing apparatus 1000 changes the shooting direction according to the instruction to change the shooting direction that has been received from the client 3000. The capturing apparatus 1000 changes the angle of view according to the instruction to change the angle of view that has been received from the client 3000.

Figure 1B:
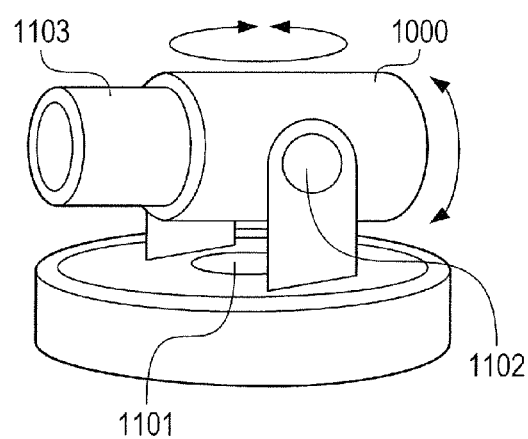
FIG. 1B is a diagram illustrating an example of a drive mechanism for allowing a capturing apparatus according to Embodiment 1 to change one of the shooting direction and the angle of view.

FIG. 1B is a diagram illustrating an example of a drive mechanism for allowing the capturing apparatus 1000 according to Embodiment 1 to change one of the shooting direction and the angle of view. A pan drive mechanism 1101 changes the shooting direction of the capturing apparatus 1000 in a pan direction. A tilt drive mechanism 1102 changes the shooting direction of the capturing apparatus 1000 in a tilt direction. Furthermore, a zoom mechanism 1103 changes the angle of view of the capturing apparatus 1000.

Figures 2, 3A, 3B:
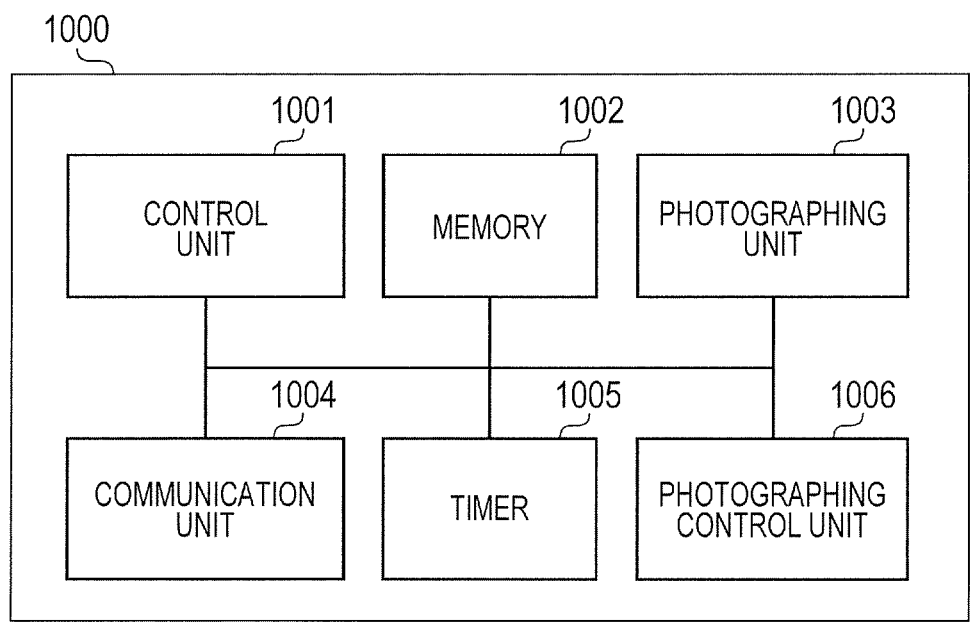
FIG. 2 is a diagram illustrating an example of a hardware configuration of the capturing apparatus according to Embodiment 1.
FIG. 3A is a diagram illustrating an example of a normal response.
FIG. 3B is a diagram illustrating an example of an error response.

FIG. 2 is a diagram illustrating an example of a hardware configuration of the capturing apparatus 1000 according to Embodiment 1. In FIG. 2, a control unit 1001 performs the entire control of the capturing apparatus 1000. The control unit 1001 is configured by, for instance, a CPU (central processing unit), and executes a program stored in an after-mentioned memory 1002. Instead, the control unit 1001 may perform the control using hardware.

The memory 1002 is used as data storage regions, such as a region for storing a program executed by the control unit 1001, a work region for the program under execution, and a region for storing a captured image generated by an after-mentioned capturing unit 1003. The memory 1002 stores a coordinate system used for representing the shooting direction of the after-mentioned capturing unit 1003. When the control unit 1001 executes one of after-mentioned specific instructions (an instruction to automatically change the image orientation and an instruction to automatically change the coordinate direction), the memory 1002 stores information indicating that the instructions are under execution. For instance, when the specific instruction is under execution, the control unit 1001 can indicate that the specific instruction is under execution, by setting a flag managed in the memory 1002.

The capturing unit 1003 converts an analog signal derived by imaging an object, into digital data. The capturing unit 1003 performs a data compression process according to the ADCT (adaptive discrete cosine transform) to thereby generate a captured image, and outputs the image to the memory 1002. After the capturing unit 1003 outputs the captured image to the memory 1002, this unit 1003 transmits an image capture event to the control unit 1001.

A communication unit 1004 receives, from the client 3000, an after-mentioned instruction to change the image capturing range illustrated in FIG. 5A, an after-mentioned instruction to change the image orientation illustrated in FIG. 5B, and an after-mentioned instruction to change the coordinate direction illustrated in FIG. 7. On reception of the instructions illustrated in FIGS. 5A, 5B and 7, the communication unit 1004 transmits a reception event to the control unit 1001. The communication unit 1004 transmits, to the client 3000, responses to the instructions in FIGS. 5A, 5B and 7. In this embodiment, the communication unit 1004 transmits, to the client 3000, one of a normal response, which is a response for indicating that the received instruction has been normally executed, and an error response, which is a response for indicating that the received instruction has not been executed. FIG. 3A is a diagram illustrating an example of the normal response. FIG. 3B is a diagram illustrating an example of the error response.

The instruction to change the image orientation is an example of a first instruction. The instruction to change the coordinate direction is an example of a second instruction.

A timer 1005 captures a time elapsed after the capturing apparatus 1000 receives one of the instruction to change the image orientation and the instruction to change the coordinate direction.

With respect to the instruction to change the image orientation, the communication unit 1004 receives an instruction for a query about a capability pertaining to change in image orientation of the capturing apparatus of this embodiment (hereinafter, sometimes called an instruction for a query about the image orientation changing capability). For instance, the capturing apparatus 1000 of this embodiment transmits an Auto response, which is a response indicating that the capturing apparatus automatically changes the image orientation, in response to the instruction for a query about the image orientation changing capability.

A capturing control unit 1006 controls the pan drive mechanism 1101, the tilt drive mechanism 1102 and the zoom mechanism 1103, according to designation by the control unit 1001. That is, when the communication unit 1004 receives, from the client 3000, an image range changing instruction, which will be illustrated later with reference to FIG. 5A, a reception event in response to the instruction is transmitted to the control unit 1001. Upon reception of the reception event, the control unit 1001 issues control designation to the capturing control unit 1006 according to the content of the reception event. The capturing control unit 1006, having received the control designation, performs control to drive one of the pan drive mechanism 1101, the tilt drive mechanism 1102 and the zoom mechanism 1103, in response to the control designation. The capturing control unit 1006 performs change control for changing the shooting direction in which the capturing unit 1003 takes an image, to a position identified by the coordinates designated by the image range changing instruction, which will be illustrated with reference to FIG. 5A, and the coordinate system stored in the memory 1002. Thus, the capturing control unit 1006 performs control of changing the shooting direction of the capturing unit 1003 to the shooting direction identified by the specifying information.

The internal configuration of the capturing apparatus 1000 has been described above. The processing block illustrated in FIG. 2 is illustration of an example of this embodiment of the capturing apparatus of this embodiment. The configuration is not limited thereto. Various modification and change, for instance, provision of an audio input unit, can be made within the gist of this embodiment can be made.

In this embodiment, description is made assuming that the control unit 1001 executes processing based on the program stored in the memory 1002 to thereby execute processing pertaining to functions and flowcharts of the capturing apparatus 1000, which will be described later. More specifically, the functions may be a function of causing the client 3000 to receive an instruction (first reception function), a function of controlling rotation of the captured image and rotation of the coordinate system, and a function of transmitting the captured image to the client 3000 (first transmission function).

Figure 4:
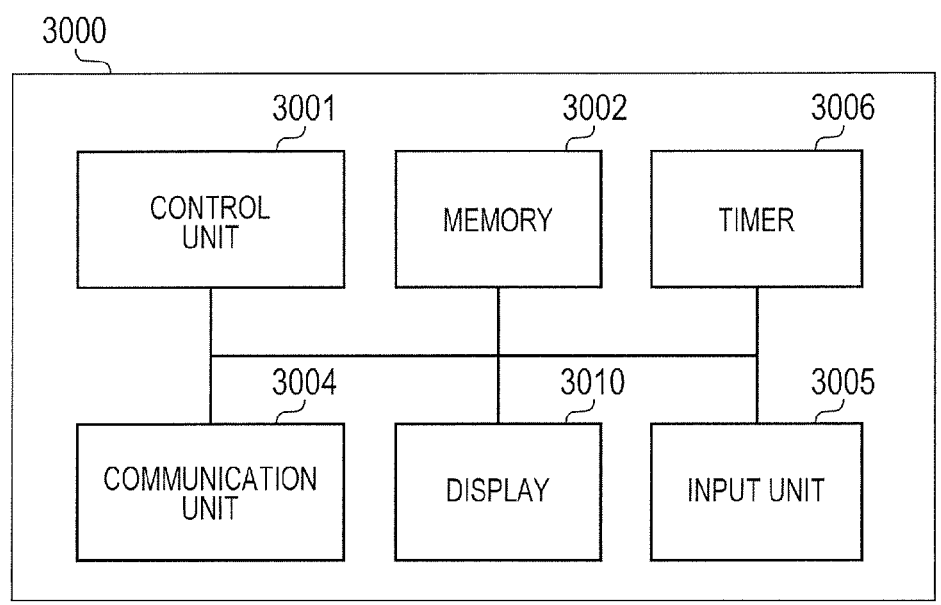
FIG. 4 is a diagram illustrating an example of a hardware configuration of a client.

FIG. 4 is a diagram illustrating an example of the hardware configuration of the client 3000. A control unit 3001 performs the entire control of the client 3000. The control unit 3001 is configured by, for instance, a CPU, and executes a program stored in an after-mentioned memory 3002. Instead, the control unit 3001 may control using hardware.

The memory 3002 is used as a storage region for a program executed by the control unit 3001, a working region for program execution, and a data storage region.

A communication unit 3004 receives the captured image transmitted from the capturing apparatus 1000. The communication unit 3004 transmits an instruction to control the capturing apparatus 1000.

An input unit 3005 receives an input of designation by a user. For instance, an input unit 3005 can receive an input of designation for transmitting various instructions to the capturing apparatus 1000, as designation by the user. The instruction for the capturing apparatus 1000 will be described later in detail with reference to FIGS. 5A, 5B and 7. Upon input of designation by the user for transmitting an instruction to the capturing apparatus 1000, the input unit 3005 notifies the control unit 3001 that the instruction has been input. The control unit 3001 generates an instruction for the capturing apparatus 1000 in response to the designation input into the input unit 3005, and performs transmission control of transmitting the generated instruction to the capturing apparatus 1000 via the communication unit 3004.

The input unit 3005 can accept an input of a response by the user to a query message to the user which the control unit 3001 generates by executing the program stored in the memory 3002.

A timer 3006 captures the time elapsed after one of the instruction to change the image orientation and the instruction to change the coordinate direction is transmitted to the capturing apparatus 1000.

A display 3010 displays the captured image received from the communication unit 3004. The display 3010 can display the query message to the user which the control unit 3001 generates by executing the program stored in the memory 3002.

The control unit 3001 performs processing based on the program stored in the memory 3002, thereby allowing after-mentioned functions of the client 3000 to be achieved. More specifically, the functions are a function of transmitting an instruction to the capturing apparatus 1000 (second transmission function), a function of receiving the captured image from the capturing apparatus 1000 (second reception function), and a function of controlling the display 3010 to display the received captured image.

[Description of Instruction]

Next, an instruction provided by the client 3000 for the capturing apparatus 1000 will be described with reference to FIGS. 5A, 5B and 7. As illustrated in FIGS. 5A, 5B and 7, each instruction includes information of a destination address representing a destination of an object on which an instruction is executed, and a source address representing a source of the instruction. Furthermore, each instruction includes information on the content and arguments of the instruction.

First, an example of the image range changing instruction will be described with reference to FIG. 5A. According to the image range changing instruction, the client 3000 changes the image capturing range of the capturing apparatus 1000. The arguments of the image range changing instruction are pan coordinates, tilt coordinates and zoom coordinates in the coordinate system stored in the memory 1002. In this embodiment, the client 3000 and the capturing apparatus 1000 normalize the angles in the horizontal direction where the capturing apparatus 1000 can take an image, from −1.0 to +1.0. Values from −1.0 to +1.0 are regarded as the pan coordinates, and the pan direction of the capturing apparatus is represented. Likewise, the client 3000 and the capturing apparatus 1000 normalize the angles in the vertical direction where the capturing apparatus 1000 can take an image, from −1.0 to +1.0. Values from −1.0 to +1.0 are regarded as the tilt coordinates, and the tilt direction of the capturing apparatus is represented. Furthermore, in this embodiment, the client 3000 and the capturing apparatus 1000 normalize values ranging from the telephoto end to the wide angle end of zooming, to a range from 0.0 to +1.0. The zooming value may be, for instance, one of values of zoom magnification and focal length. Values from 0.0 to +1.0 are regarded as zoom coordinates, and the zoom position of the capturing apparatus is represented.

Through use of this instruction, the client 3000 designates the absolute positions of the pan coordinates, the tilt coordinates, and the zoom coordinates, and can change the image capturing range of the capturing apparatus 1000 in any manner. The pan coordinates, the tilt coordinates and the zoom coordinates stored according to the image range changing instruction are information for specifying the shooting direction in the coordinate system that is stored in the memory 1002. The image range changing instruction does not necessarily include specifying information of all the pan coordinates, the tilt coordinates and the zoom coordinates. At least one piece of specifying information is sufficient.

The specifying information is not limited to information designating the absolute position of one of the pan coordinates, the tilt coordinates and the zoom coordinates. The specifying information may be for representing a relative position in the shooting direction after movement with respect to the current shooting direction using a coordinate system. For instance, the specifying information may be information on the moving direction from the current position in the coordinate system and the moving quantity. This scheme can also identify the shooting direction in the coordinate system. Such a configuration allows the user to use the client 3000 to issue designation, for instance, "moving the shooting direction from the current position by +0.5 in the pan direction."

Furthermore, the specifying information is not limited to the cases of using the normalized values as described above. For instance, the pan coordinates and the tilt coordinates may be moving angles from the reference positions (e.g., the pan end and the tilt end) in movable ranges of the pan drive mechanism 1101 and the tilt drive mechanism 1102, respectively. The values of the zoom magnification and the focal length may be used as zoom coordinates.

Next, an example of the instruction to change the image orientation will be described with reference to FIG. 5B. According to the instruction to change the image orientation, the client 3000 rotates the direction of the captured image delivered by the capturing apparatus 1000 by a predetermined angle (180 degrees in this embodiment). The capturing apparatus 1000 can rotate the direction of the captured image about a center of rotation, which is, for instance, the intersection of diagonal lines of the captured image. The argument of the instruction to change the image orientation is the image orientation. In this embodiment, OFF represents a normal orientation, and ON represents an inverted orientation. In this embodiment, Auto is an argument for causing the capturing apparatus of this embodiment to automatically change the orientation of the captured image. That is, the instruction to change the image orientation whose argument is Auto is a fourth instruction of setting the capturing apparatus 1000 to perform processing on the instruction to change the image orientation and processing on the instruction to change the coordinate direction when the instruction to change the coordinate direction is accepted.

Figure 6:
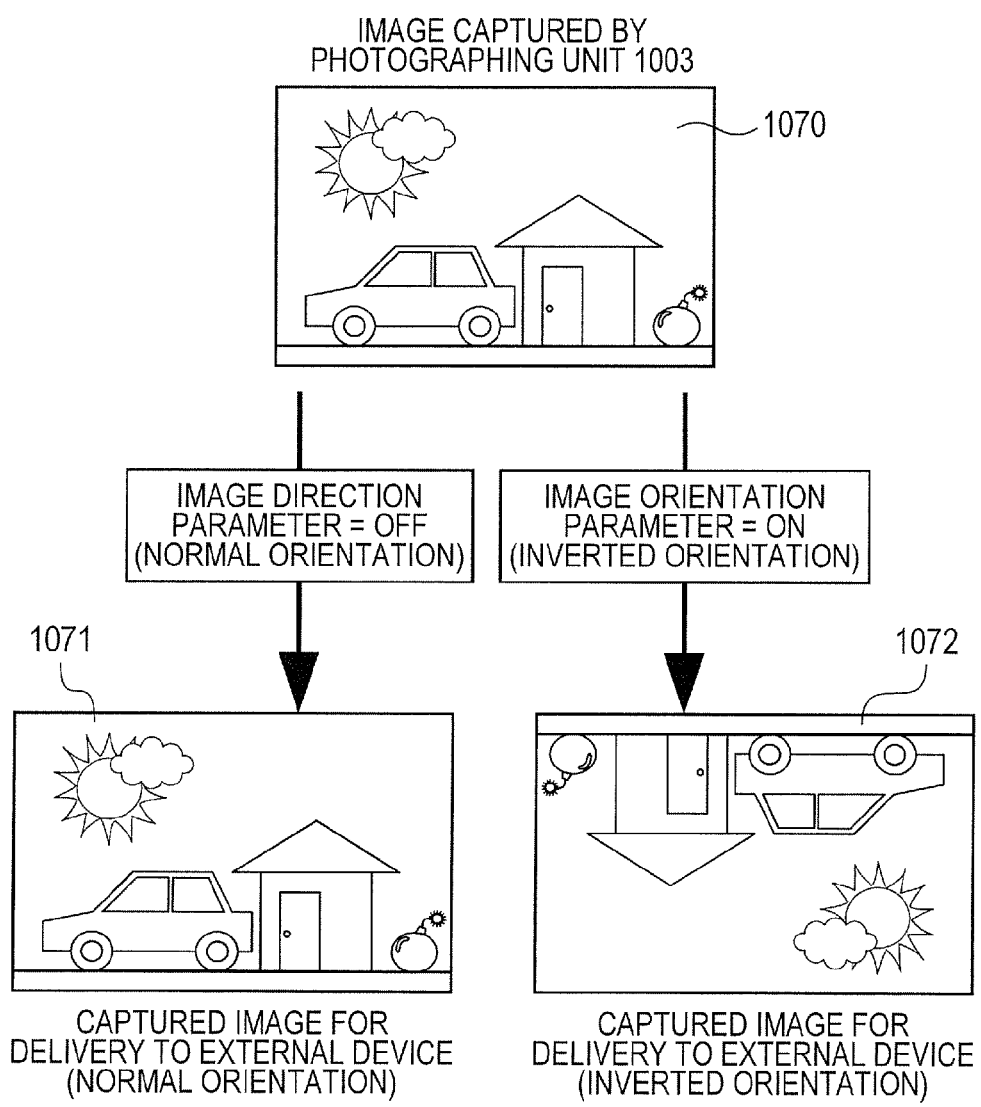
FIG. 6 is a diagram for illustrating a normal orientation and an inverted orientation of a captured image.

FIG. 6 is a diagram for illustrating the normal orientation and the inverted orientation of the captured image. In FIG. 6, the captured image 1070 is a captured image captured by the capturing unit 1003 of the capturing apparatus 1000. A captured image 1071 is a captured image delivered to the client 3000 in the case where the instruction to change the image orientation illustrated in FIG. 5B designates OFF (normal orientation). If the instruction to change the image orientation designates OFF (normal orientation), the capturing apparatus 1000 transmits the captured image 1071 having the same image orientation as that of the captured image 1070 to the client 3000. A captured image 1072 is a captured image delivered to the client 3000 in the case where the instruction to change the image orientation illustrated in FIG. 5B designates ON (inverted orientation). If the instruction to change the image orientation designates ON (inverted orientation), the capturing apparatus 1000 in this embodiment transmits the captured image 1072, in which the vertical and horizontal orientations of the captured image 1070 are reversed, to the client 3000.

Thus, upon reception of the instruction to change the image orientation illustrated in FIG. 5B, the capturing apparatus 1000 rotates the captured image captured by the capturing unit 1003 by a predetermined angle (reversed by 180 degrees in this embodiment) and transmits the image to the client 3000.

FIG. 7 is a diagram illustrating the instruction to change the coordinate direction. According to the instruction to change the coordinate direction, the client 3000 can rotate the coordinate system stored in the memory 1002 about the origin by a predetermined angle (180 degrees in the case of this embodiment). According to the instruction to change the coordinate direction, the client 3000 can rotate the direction of the coordinate system by an angle same as the angle by which the instruction to change the image orientation can rotate the captured image. Upon reception of the instruction to change the coordinate direction, the capturing apparatus 1000 rotates the direction of the coordinate system about the center of rotation, which is, for instance, the origin of the coordinate system. The argument of the instruction to change the coordinate direction is the coordinate direction. OFF indicates the normal orientation. ON indicates the inverted orientation. In this embodiment, the argument of Auto is designation of causing the capturing apparatus 1000 of this embodiment to automatically change the coordinate direction. That is, the instruction to change the coordinate direction whose argument is Auto is a third instruction of setting the capturing apparatus 1000 to perform processing on instruction to change the image orientation, and processing on the instruction to change the coordinate direction, when the instruction to change the image orientation is accepted.

Figure 8:
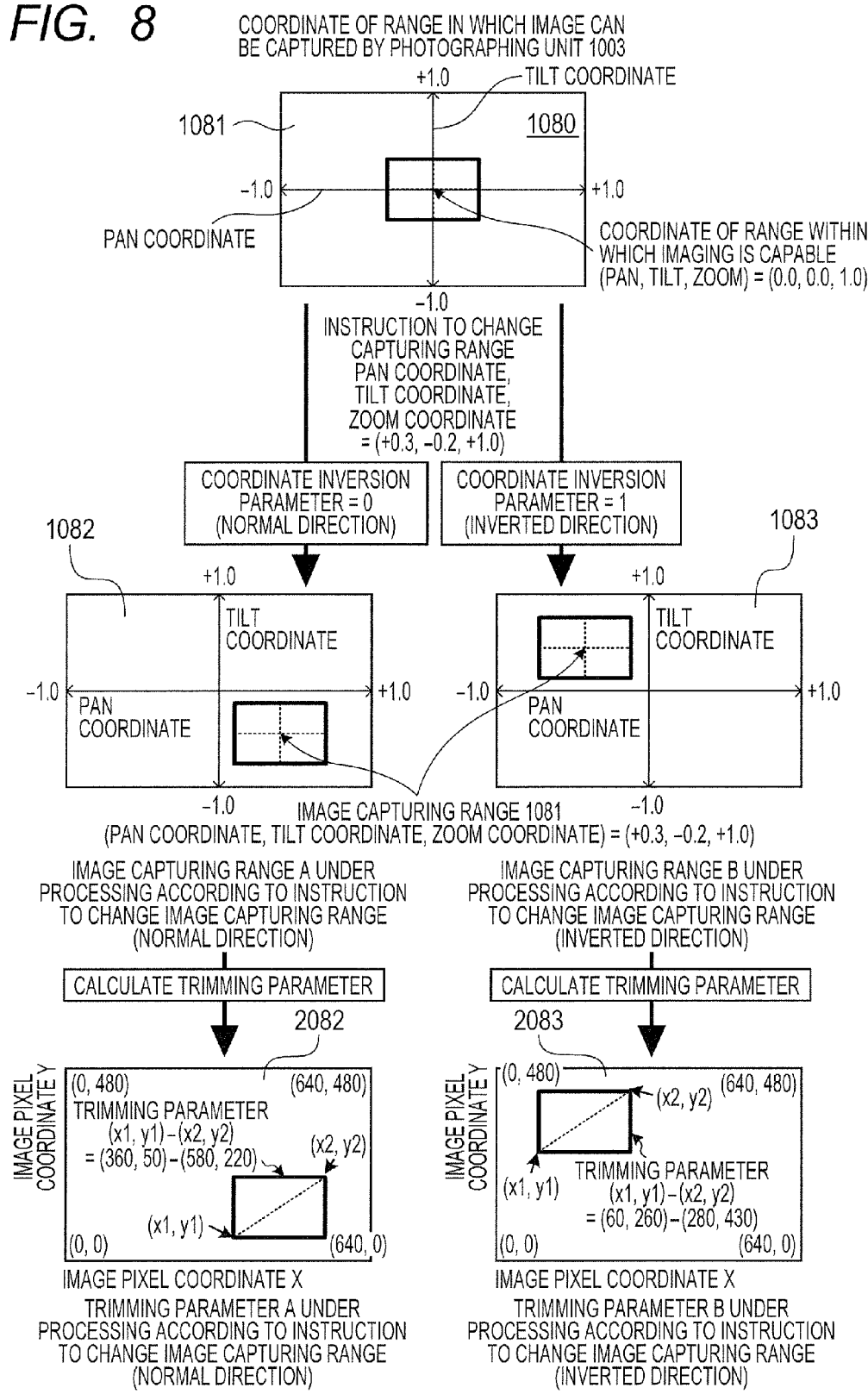
FIG. 8 is a diagram for illustrating the normal orientation and the inverted orientation in the coordinate direction.

FIG. 8 is a diagram for illustrating the normal orientation and the inverted orientation of the coordinate direction. In FIG. 8, coordinates 1080 represent a range in which the image can be captured by the capturing unit 1003 of the capturing apparatus 1000. As described above, in the coordinates 1080, the ranges of the pan coordinates and the tilt coordinates are normalized into a range from −1.0 to +1.0. An image capturing range 1081 represents a current image capturing range by the capturing unit 1003 in the range in which the image can be captured. In the coordinates 1080, the pan coordinates, the tilt coordinates and the zoom coordinates are set to (0.0, 0.0, 1.0).

Coordinates 1082 and coordinates 1083 represent cases where the instruction to change the image capturing range illustrated in FIG. 5A changes the pan coordinates, the tilt coordinates and the zoom coordinates of the image capturing range 1081 to (0.3, −0.2, 1.0).

The coordinates 1082 represents an image capturing range in the case where the coordinate direction in the normal orientation is selected as an argument of the instruction to change the coordinate direction in FIG. 7. If the coordinate direction in the normal orientation is selected as the argument of the instruction to change the coordinate direction, the capturing apparatus 1000 stores the coordinate system having the same direction as that of the coordinates 1080.

In contrast, the coordinates 1083 represent the image capturing range 1081 in the case where the coordinate direction in the inverted orientation is selected as the argument of the instruction to change the coordinate direction in FIG. 7. If the coordinate direction in the inverted orientation is selected as the argument of the instruction to change the coordinate direction, the capturing apparatus 1000 rotates the coordinate system of the coordinates 1080 (inversion by 180 degrees in this embodiment).

In comparison to the coordinates 1082, the coordinates 1083 have a coordinate system representing the range in which the image can be captured is rotated (inversion by 180 degrees). Accordingly, the coordinates 1082 and the coordinates 1083 have different positions of the image capturing range 1081 captured by the capturing apparatus 1000 in the range in which the image can be captured in the case where the pan coordinates, the tilt coordinates and the zoom coordinates of the image capturing range 1081 are changed to (0.3, −0.2, 1.0).

Next, an operation of the capturing apparatus 1000 according to this embodiment will be described with reference to flowcharts illustrated in FIGS. 9 and 10A to 10D. In the case where the control unit 1001 of the capturing apparatus 1000 internally includes a processor, the processor is a computer, and executes the program read from the memory 1002 included in the capturing apparatus 1000, thereby achieving the following flowcharts.

[Description of Flowchart]

Figure 9:
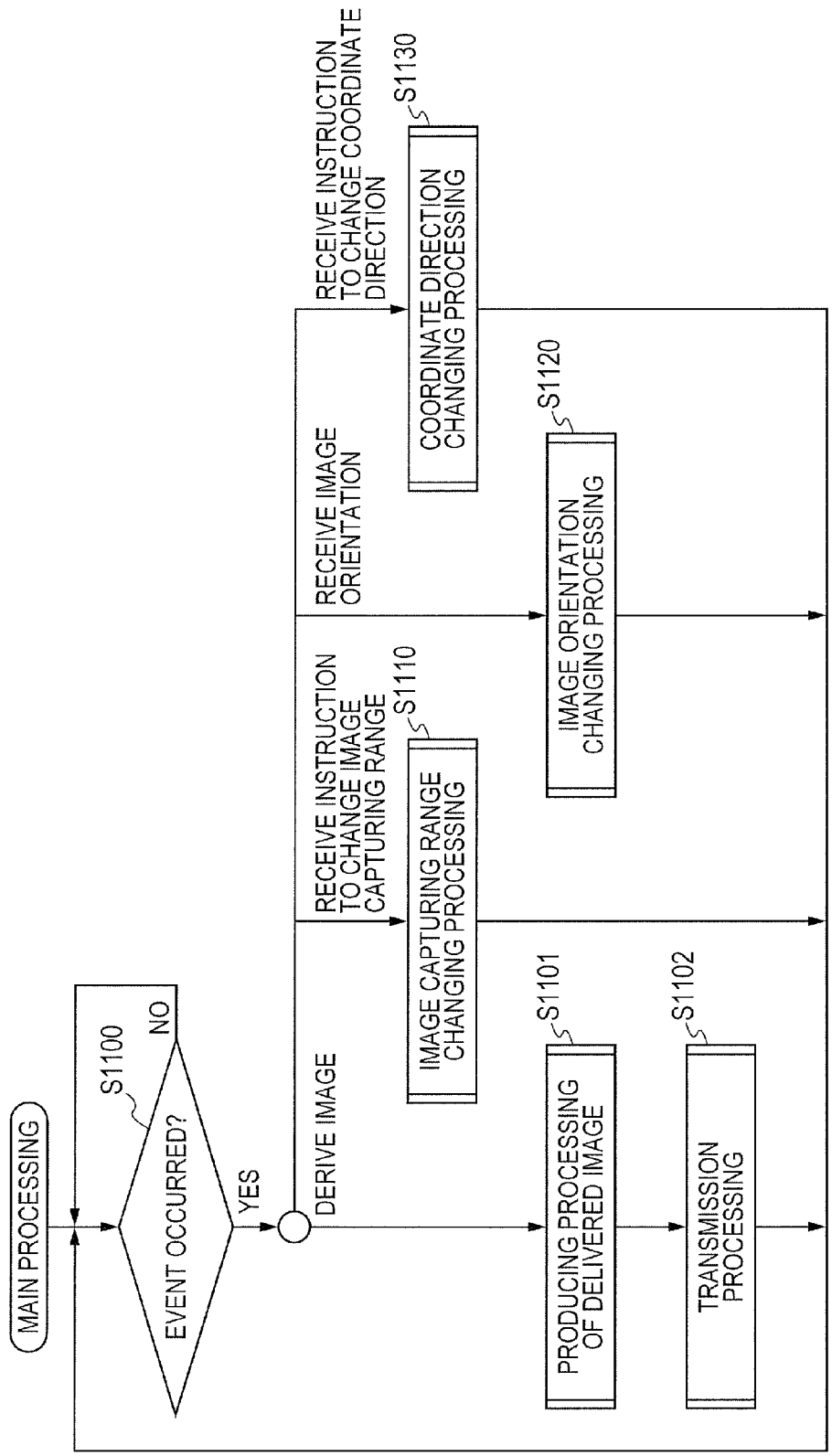
FIG. 9 is a flowchart illustrating an example of main processing of the capturing apparatus.

FIG. 9 is a flowchart illustrating an example of main processing of the capturing apparatus 1000.

First, the control unit 1001 waits for an event (S1100). In this embodiment, the control unit 1001 determines that an event occurs, in the case of one of deriving an image, receiving the instruction to change the image capturing range, receiving the instruction to change the image orientation, and receiving the instruction to change the coordinate direction.

When the image capture event occurs, the control unit 1001 performs processes from step S1101 to step S1102. Here, the image capture event is an event occurring when an image deriving request for deriving the captured image captured by the capturing apparatus 1000 is transmitted from the client 3000 to the capturing apparatus 1000 and received by the capturing apparatus 1000.

When the image capture event occurs, the control unit 1001 performs producing processing of an image to be delivered (S1100). The producing processing of an image to be delivered will be described later in detail with reference to FIG. 10A.

After the producing processing of an image to be delivered is completed, the control unit 1001 performs transmission processing (S1102). In the transmission processing, the control unit 1001 transmits the image to be delivered produced by the producing processing of the image to be delivered in step S1101, via the communication unit 1004 to the client 3000, which is requesting the capturing apparatus 1000 to deliver the image. After the transmission processing, the control unit 1001 returns to step S1100 and performs processing.

Upon reception of the instruction to change the image capturing range illustrated in FIG. 5A from the client 3000, the control unit 1001 of the capturing apparatus 1000 performs image capturing range changing processing, which will be described later with reference to FIG. 10B (S1110).

Upon reception of the instruction to change the image orientation illustrated in FIG. 5B from the client 3000, the control unit 1001 performs image orientation changing processing, which will be described later with reference to FIG. 10C (S1120).

Upon reception of the instruction to change the coordinate direction illustrated in FIG. 7 from the client 3000, the control unit 1001 performs coordinate direction changing processing, which will be described later with reference to FIG. 10D (S1130).

After the processing of one of steps S1110, S1120, S1130 and S1140 is completed, the control unit 1001 returns to step S1100 and performs processing.

Figure 10A:
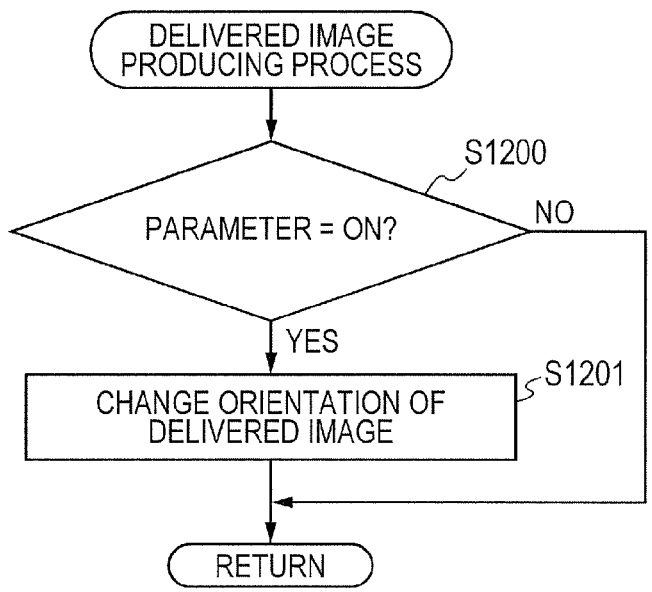
FIG. 10A is a flowchart illustrating an example of a producing processing of an image to be delivered in step S1101.

FIG. 10A is a flowchart illustrating an example of the producing processing of an image to be delivered in step S1101.

The control unit 1001 refers to the memory 1002 and verifies the image orientation parameter (S1200). If the image orientation parameter is ON (Yes in S1200), the control unit 1001 reverses the captured image as illustrated in the captured image 1072 in FIG. 6 (reversed by 180 degrees), and overwrites the captured image stored in the memory 1002. The control unit 1001 finishes the producing processing of an image to be delivered (S1201). If the image orientation parameter is OFF (No in S1200), the control unit 1001 does not perform the processing and finishes the producing processing of an image to be delivered.

Figure 10B:
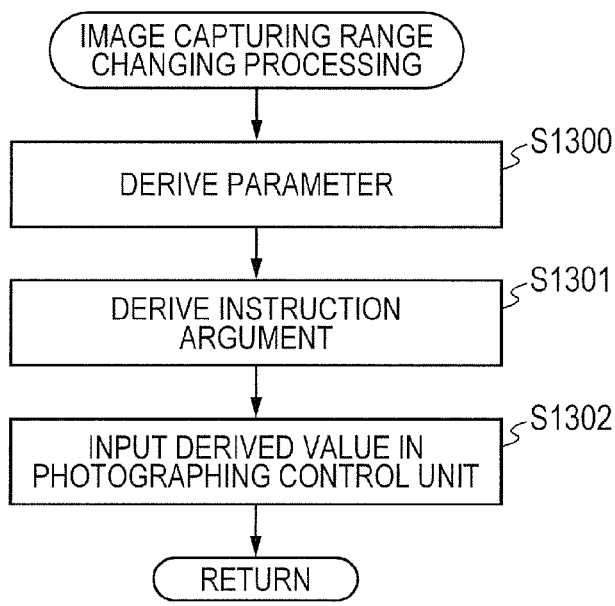
FIG. 10B is a flowchart illustrating an example of an image capturing range changing processing in step S1110.

FIG. 10B is a flowchart illustrating an example of the image capturing range changing processing in step S1110.

The control unit 1001 refers to the memory 1002, and derives the coordinate direction parameter of the instruction to change the coordinate direction illustrated in FIG. 7 (S1300). Furthermore, the control unit 1001 refers to the memory 1002, and derives the arguments (the pan coordinates, the tilt coordinates and the zoom coordinates) of the instruction to change the image capturing range illustrated in FIG. 5A (S1301).

The control unit 1001 inputs the derived coordinate direction parameter, pan coordinates, tilt coordinates, and zoom coordinates into the capturing control unit 1006 (S1302). Thus, if the coordinate direction parameter is ON (inverted orientation), the capturing control unit 1006 reverses the coordinate system as with the coordinates 1083 illustrated in FIG. 8, and operates the shooting direction of the capturing unit 1003. On the other hand, if the coordinate direction parameter is OFF (normal orientation), the capturing control unit 1006 does not reverse the coordinate system, which is analogous to the case of the coordinates 1082 illustrated in FIG. 8, and this unit 1006 operates the shooting direction of the capturing unit 1003. As described above, the control unit 1001 finishes the image capturing range changing processing.

Figure 10C:
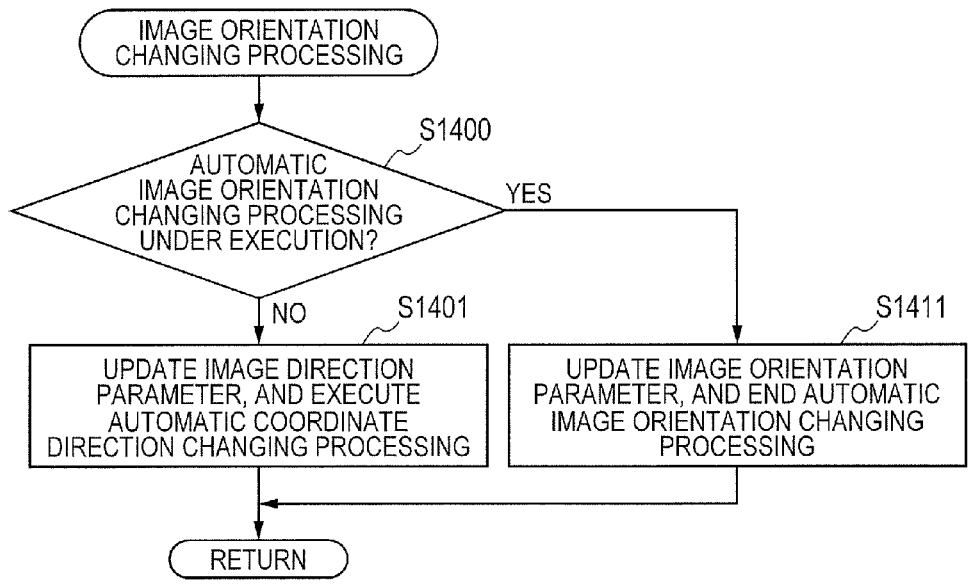
FIG. 10C is a flowchart illustrating an example of an image orientation changing processing in step S1120.

FIG. 10C is a flowchart illustrating an example of image orientation changing processing in step S1120.

First, the control unit 1001 refers to the memory 1002, and determines whether the automatic image orientation changing processing is under execution or not (S1400). The automatic image orientation changing processing in this embodiment is processing executed by the control unit 1001 to automatically execute instruction to change the image orientation independently from the instruction to change the image orientation received by the communication unit 1004. In the automatic image orientation changing processing in this embodiment, when the communication unit 1004 receives the instruction to change the coordinate direction, the image orientation is changed without receiving the instruction to change the image orientation. The automatic image orientation changing processing will be described later in detail with reference to FIG. 10D. If the automatic image orientation changing processing is not under execution (No in S1400), the control unit 1001 reads the argument of the received instruction to change the image orientation and changes the image orientation parameter in the memory 1002. Furthermore, the control unit 1001 performs automatic coordinate direction changing processing (S1401).

The automatic coordinate direction changing processing in this embodiment is processing executed by the control unit 1001 to automatically execute instruction to change the coordinate direction independently from the instruction to change the coordinate direction received by the communication unit 1004. When the communication unit 1004 receives the instruction to change the image orientation, the automatic coordinate direction changing processing is executed without reception of the instruction to change the coordinate direction, for instance. In the automatic coordinate direction changing processing, the control unit 1001 performs an instruction to automatically rotate the direction of the coordinate system by an angle identical to an angle allowing the captured image to be rotated according to the instruction to change the image orientation. That is, the control unit 1001 executes the received instruction to change the image orientation while automatically executing the instruction to change the coordinate direction in step S1401.

When the automatic coordinate direction changing processing is started in step S1401, the control unit 1001 stores, in the memory 1002, information indicating that the automatic coordinate direction changing processing is under execution. For instance, according to the information indicating that the automatic coordinate direction changing processing is under execution, setting of an automatic coordinate direction changing processing flag can indicate that the automatic coordinate direction changing processing is under execution, and resetting of the flag can indicate the processing is not under execution. The method of storing the information indicating that the automatic coordinate direction changing processing is under execution is not limited thereto. Instead, the method may be any method allowing the control unit 1001 to determine whether the automatic coordinate direction changing processing is under execution or not.

As described above, when the communication unit 1004 receives the instruction to change the image orientation, the control unit 1001 performs control of executing the instruction to change the image orientation and the instruction to change the coordinate direction. The instruction to change the image orientation is an instruction received by the communication unit 1004. The instruction to change the coordinate direction is an instruction executed by the control unit 1001 performing the automatic coordinate direction changing processing.

According to these operations, the capturing apparatus 1000 can output the captured image (the captured image 1072 in FIG. 6) with the changed image orientation, and change the image capturing range based on the changed coordinates (the coordinates 1083 in FIG. 8). Accordingly, in a state where the image orientation (normal orientation/inverted orientation) matches with the coordinate direction (normal orientation/inverted orientation), the captured image can be output and the image capturing range can be changed. Thus, the image orientation (normal orientation/inverted orientation) and the coordinate direction (normal orientation/inverted orientation) can be prevented from being mismatched with each other.

In contrast, if the automatic image orientation changing processing is under execution (Yes, in S1400), the control unit 1001 reads the argument of the received instruction to change the image orientation and changes the image orientation parameter in the memory 1002. The control unit 1001 finishes the automatic image orientation changing processing (S1411). After the processing in step S1411, the control unit 1001 finishes the image orientation changing processing.

As described above, the automatic image orientation changing processing is processing executed after the communication unit 1004 receives the instruction to change the coordinate direction. That is, if the automatic image orientation changing processing is under execution (Yes, in S1400), the communication unit 1004 has already received the instruction to change the coordinate direction; the instruction is under execution. The processing in step S1411 is executed in such a state, thereby allowing the control unit 1001 to execute the instruction to change the image orientation received by the communication unit 1004 and the instruction to change the coordinate direction received by the communication unit 1004.

According to these operations, the capturing apparatus 1000 can output the captured image (the captured image 1072 in FIG. 6) with the changed image orientation, and change the image capturing range based on the changed coordinates (the coordinates 1083 in FIG. 8). Accordingly, in a state where the image orientation (normal orientation/inverted orientation) matches with the coordinate direction (normal orientation/inverted orientation), the captured image can be output and the image capturing range can be changed.

In this embodiment, it may be configured such that the automatic image orientation changing processing is performed only if a response to the instruction for a query about the image orientation changing capability is an Auto response. In this case, since the response to the instruction for a query about the image orientation changing capability is the Auto response, the client 3000 typically only transmits the instruction to change the image orientation that includes an Auto argument, or does not transmit the instruction to change the image orientation. If the client 3000 transmits the instruction to change the image orientation that does not include the Auto argument, the capturing apparatus 1000 of this embodiment returns an error response. Thus, in response to reception of the instruction to change the image orientation that does not include the Auto argument, it is notified that the instruction is not accepted.

As described above, the second instruction of rotating the coordinate system stored in the memory 1002 by the predetermined angle is accepted, but the first instruction (the instruction to change the image orientation that does not include the Auto argument) of rotating the captured image by the capturing unit 1003 by the predetermined angle is not accepted. According to these operations, this embodiment has an advantageous effect capable of outputting the captured image in a state where the image orientation (normal orientation/inverted orientation) matches with the coordinate direction (normal orientation/inverted orientation), in response to reception of the instruction to change the coordinate direction, even without reception of the instruction to change the image orientation.

As described above, the capturing apparatus 1000 can perform the instruction to change the image orientation such that the shooting direction always matches with the coordinate direction.

Figure 10D:
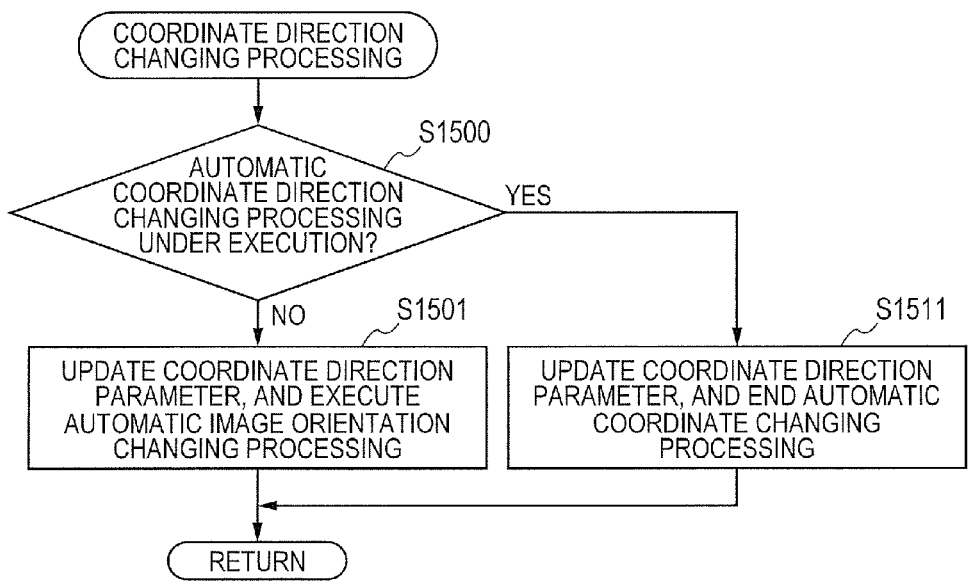
FIG. 10D is a flowchart illustrating an example of a coordinate direction changing processing in step S1130.

FIG. 10D is a flowchart illustrating an example of the coordinate direction changing processing in step S1130.

First, the control unit 1001 refers to the memory 1002, and determines whether the automatic coordinate direction changing processing is under execution or not (S1500). Here, the automatic coordinate direction changing processing of this embodiment is processing executed by the control unit 1001 to automatically execute the instruction to change the coordinate direction independently from the instruction to change the coordinate direction received by the communication unit 1004.

If the automatic coordinate direction changing processing is not under execution (No in S1500), the control unit 1001 reads the argument of the instruction to change the coordinate direction received by the communication unit 1004, and changes the image orientation parameter in the memory 1002. Furthermore, the control unit 1001 performs the automatic image orientation changing processing (S1501).

In the automatic image orientation changing processing, the control unit 1001 performs an instruction of automatically rotating the captured image by an angle identical to an angle by which the instruction to change the coordinate direction can rotate the coordinate system. That is, the control unit 1001 performs the received instruction to change the coordinate direction, while automatically performing the instruction to change the image orientation in step S1501.

In step S1501, when the automatic image orientation changing processing is started, the control unit 1001 stores, in the memory 1002, information representing that the automatic image orientation changing processing is under execution. For instance, according to the information representing that the automatic image orientation changing processing is under execution, setting of an automatic image orientation changing processing flag can indicate that the automatic image orientation changing processing is under execution, and resetting of the flag can indicate that the processing is not under execution. The method of storing the information representing that the automatic image orientation changing processing is under execution is not limited thereto. Instead, the method may be any method allowing the control unit 1001 to determine whether the automatic image orientation changing processing is under execution or not.

As described above, when the communication unit 1004 receives the instruction to change the coordinate direction, the control unit 1001 performs control of executing the instruction to change the coordinate direction and the instruction to change the image orientation. The instruction to change the coordinate direction is the instruction received by the communication unit 1004. The instruction to change the image orientation is the instruction executed by the control unit 1001 performing the automatic image orientation changing processing.

According to these operations, the capturing apparatus 1000 can output the captured image (the captured image 1072 in FIG. 6) with the changed image orientation, and change the image capturing range based on the changed coordinates (the coordinates 1083 in FIG. 8). Accordingly, in a state where the image orientation (normal orientation/inverted orientation) matches with the coordinate direction (normal orientation/inverted orientation), the captured image can be output and the image capturing range can be changed. Thus, the image orientation (normal orientation/inverted orientation) and the coordinate direction (normal orientation/inverted orientation) can be prevented from being mismatched with each other.

In contrast, if the automatic coordinate direction changing processing is under execution (Yes in S1500), the control unit 1001 reads the argument of the received instruction to change the coordinate direction, and changes the coordinate direction parameter in the memory 1002. The control unit 1001 finishes the automatic coordinate direction changing processing (S1511). After the processing in step S1511 is finished, the control unit 1001 finishes the coordinate direction changing processing.

As described above, the automatic coordinate direction changing processing is processing performed after the communication unit 1004 received the instruction to change the image orientation. That is, if the automatic coordinate direction changing processing is under execution (Yes in S1500), the state is that where the communication unit 1004 has already received the instruction to change the image orientation and the instruction is under execution. In such a state, the processing in step S1511 is performed, thereby allowing the control unit 1001 to execute the instruction to change the coordinate direction received by the communication unit 1004 and the instruction to change the image orientation received by the communication unit 1004.

According to these operations, the capturing apparatus 1000 can output the captured image (captured image 1072 in FIG. 6) with the changed image orientation, and change the image capturing range based on the changed coordinates (coordinates 1083 in FIG. 8). Accordingly, the captured image can be output and the image capturing range can be changed in a state where the image orientation (normal orientation/inverted orientation) matches with the coordinate direction (normal orientation/inverted orientation).

In this embodiment, it may be configured such that the automatic coordinate direction changing processing is performed only if a response to the instruction for a query about the coordinate direction changing capability is the Auto response. In this case, since the response to the instruction for a query about the coordinate direction changing capability is the Auto response, the client 3000 typically only transmits the instruction to change the coordinate direction that includes the Auto argument, or does not transmit the instruction to change the coordinate direction. If the client 3000 transmits the instruction to change the coordinate direction that does not includes the Auto argument, the capturing apparatus 1000 of this embodiment returns an error response. Thus, in response to reception of the instruction to change the coordinate direction that does not include the Auto argument, it is notified that the instruction is not accepted. In such a manner, the first instruction of rotating the captured image by the predetermined angle is accepted, but the second instruction (the instruction to change the coordinate direction that does not include the Auto argument) of rotating the coordinate system stored in the memory 1002 by the predetermined angle is not accepted. According to these operations, this embodiment has an advantageous effect capable of outputting the captured image in a state where the image orientation (normal orientation/inverted orientation) matches with the coordinate direction (normal orientation/inverted orientation), in response to reception of the instruction to change the image orientation, even without reception of the instruction to change the coordinate direction.

In such a manner, the capturing apparatus 1000 can execute the instruction to change the coordinate direction while the shooting direction always matches with the coordinate direction.

The capturing apparatus 1000 according to this embodiment can prevent from being into a state where only one of the image orientation and the coordinate direction is changed. Accordingly, when the user changes the image capturing range while watching the captured image delivered from the capturing apparatus 1000, the direction of the delivered captured image can match with the direction of the instruction to change the image capturing range. Accordingly, change in image capturing range according to the intention of the user can be achieved.

The capturing apparatus 1000 may transmit, to the client 3000, the normal response or an error response to each of instructions illustrated in FIGS. 5A, 5B and 7. That is, when the capturing apparatus 1000 normally processes the instruction from the client 3000, this apparatus 1000 transmits the normal response to the client 3000, which is a requestor of the instruction. When the capturing apparatus 1000 does not normally perform the instruction from the client 3000, this apparatus 1000 transmits the error response to the client 3000, which is the requestor of the instruction. This configuration allows the client 3000 to easily grasp processing results and processing timings of the instructions.

In the case where any one of the instruction to change the image orientation and the instruction to change the coordinate direction is under execution and the same instruction is received again or the other instruction is received from a client 3000 other than the requestor of the pending instruction, the capturing apparatus 1000 may return the error response to each of these instructions.

Embodiment 2

In Embodiment 2, description will be made using a capturing apparatus 2000 having a function called digital PTZ (pan tilt zoom) function, which changes a captured image displayed on the client 3000 by changing a trimming region where the captured image is trimmed.

In Embodiment 2, the case where a plurality of clients 3000 is connected to the capturing apparatus 2000 via the network 3020 will be described.

Furthermore, in Embodiment 2, an example will be described of issuing a normal response representing that an instruction from the client 3000 has normally been performed, or an error response representing that the instruction has not been performed, in response to the instruction.

FIG. 11 is a diagram illustrating an example of the configuration of the capturing apparatus 2000 according to Embodiment 2. The capturing apparatus 2000 in this embodiment does not include the pan drive mechanism 1101, the tilt drive mechanism 1102 and the zoom mechanism 1103, which are illustrated in FIG. 1B.

FIG. 12 is a diagram illustrating an example of the hardware configuration of the capturing apparatus 2000.

As with Embodiment 1, the memory 1002 of the capturing apparatus 2000 stores information representing that the control unit 1001 has performed one of the automatic coordinate direction changing processing and the automatic image orientation changing processing. Furthermore, in this embodiment, the memory 1002 stores information representing which client 3000 among the clients 3000 connected to the network 3020 has issued one of the automatic coordinate direction changing processing and the automatic image orientation changing processing and, in response thereto, the processing has been performed.

The capturing apparatus 2000 does not include the capturing control unit 1006. This configuration is different from that of the capturing apparatus 1000 in Embodiment 1. The control unit 1001 of the capturing apparatus 2000 generates a captured image from a part of an image captured by the capturing unit 1003, and transmits the captured image to the client 3000 via the communication unit 1004.

The capturing apparatus 2000 in Embodiment 2 receives designation on a capturing position of the captured image as trimming parameters, from the client 3000. The trimming parameters are parameters for identifying the part where the captured image generated by the capturing unit 1003 is trimmed and delivered to the client 3000.

FIG. 13 is a diagram illustrating an example of the trimming parameters. The trimming parameters illustrated in FIG. 13 are two points (x1, y1) and (x2, y2) represented by X coordinates indicating the horizontal direction and Y coordinates indicating the vertical direction of the captured image. A rectangle whose diagonal points are these two points represents a trimming range.

In Embodiment 2, if the capturing apparatus 2000 normally processes the instruction from the client 3000, this apparatus 2000 transmits the normal response to the client 3000, which is the requestor of the instruction. If the capturing apparatus 2000 does not normally process the instruction from the client 3000, the apparatus 2000 transmits the error response to the client 3000, which is the requestor of the instruction. FIG. 14A is a diagram illustrating an example of the normal response. FIG. 14B is a diagram illustrating an example of the error response.

Next, the main processing of the capturing apparatus 2000 in Embodiment 2 will be described with reference to FIG. 9 in Embodiment 1.

First, the control unit 1001 of the capturing apparatus 2000 waits for an event (S1100). In this embodiment, the capturing apparatus 2000 determines that an event occurs, in the case of one of deriving an image, receiving the instruction to change the image capturing range, receiving the instruction to change the image orientation, and receiving the instruction to change the coordinate direction.

When the image capture event occurs, the control unit 1001 performs the producing processing of an image to be delivered (S1101). Points of the producing processing of an image to be delivered in this embodiment that are different from those of the processing described with reference to FIG. 10A in Embodiment 1 will be described. In this embodiment, if the image orientation parameter is OFF (normal orientation) in the producing processing of an image to be delivered (No in step S1200 in FIG. 10A), the control unit 1001 trims the captured image according to the trimming parameters illustrated in FIG. 13. Here, trimming is cropping of the image identified by the trimming parameters in the image capturing range of the capturing unit 1003.

If the image orientation parameter is ON (inverted orientation) (Yes in S1200), the control unit 1001 changes the image orientation according to the image orientation parameter in step S1201 illustrated in FIG. 10A and subsequently trims the captured image according to the trimming parameters. After the captured image is trimmed, the control unit 1001 overwrites the trimmed captured image onto the captured image stored in the memory 1002, and finishes the producing processing of an image to be delivered.

After the producing processing of an image to be delivered is finished, the control unit 1001 performs the transmission processing (S1102). In the transmission processing, the control unit 1001 transmits the image to be delivered that has been trimmed by the producing processing of the image to be delivered in step S1101, to the client 3000 which has been requesting the image delivery from the capturing apparatus 2000, via the communication unit 1004. After the transmission processing, the control unit 1001 returns to step S1100 and performs processing.

Upon reception of the instruction to change the capturing range from the client 3000, the control unit 1001 performs the image capturing range changing processing (S1110). Points of the image capturing range changing processing in this embodiment that are different from those in Embodiment 1 described with reference to FIG. 10B will be described. In the image capturing range changing processing, the control unit 1001 according to this embodiment performs processing in steps S1300 and S1301 illustrated in FIG. 10B and subsequently calculates the trimming parameters in step S1302 in FIG. 10B. That is, if the derived coordinate direction parameter is ON (inverted orientation), the control unit 1001 reverses the coordinate system as with the coordinates 1083 in FIG. 8, thereby determining the trimming range. In contrast, if the derived coordinate direction parameter is OFF (normal orientation), the control unit 1001 does not reverse the coordinate system in a manner analogous to the case of the coordinates 1082 in FIG. 8 and determines the trimming range.

Subsequently, the control unit 1001 of this embodiment determines the position of the trimming range in the coordinates adopting a pixel as the unit. Coordinates 2082 and 2083 in FIG. 8 adopt a lower left vertex as the origin, and are represented by X and Y coordinates adopting a pixel as the unit. As illustrated in the coordinates 2082 and 2083 in FIG. 8, the control unit 1001 calculates, as the trimming parameters, two pixel coordinate points (x1, y1) and (x2, y2) on the captured image that correspond to two vertices, i.e., the diagonal points of the determined trimming range. The control unit 1001 stores the calculated trimming parameter in the memory 1002. The control unit 1001 finishes the image capturing range changing processing.

Upon reception of the instruction to change the image orientation from the client 3000, the control unit 1001 according to this embodiment performs the image orientation changing processing (S1120). Upon reception of the instruction to change the coordinate direction from the client 3000, the control unit 1001 according to this embodiment performs the coordinate direction changing processing (S1130).

Next, the image orientation changing processing in step S2120 will be described. First, the control unit 1001 refers to the memory 1002, and determines whether or not the automatic image orientation changing processing is under execution according to the instruction to change the coordinate direction received from the client 3000 having transmitted the instruction to change the image orientation.

Here, the automatic image orientation changing processing is executed when the communication unit 1004 receives the instruction to change the coordinate direction, as with Embodiment 1. That is, if the automatic image orientation changing processing is executed, the communication unit 1004 has already received the instruction to change the coordinate direction. If the automatic image orientation changing processing has not been executed, the communication unit 1004 has not been received the instruction to change the coordinate direction yet.

The control unit 1001 determines whether the automatic image orientation changing processing is under execution or not by referring to the memory 1002. As with Embodiment 1, the memory 1002 stores information on whether the automatic image orientation changing processing is under execution or not. Furthermore, the memory 1002 stores information representing which client 3000 among the clients 3000 connected to the capturing apparatus 2000 via the network 3020 has issued the instruction to change the coordinate direction and, in response thereto, the automatic image orientation changing processing has been performed. In the case of performing the automatic image orientation changing processing, the control unit 1001 performs control of storing, in the memory 1002, information representing which client 3000 has issued the instruction to change the coordinate direction and, in response thereto, the automatic image orientation changing processing is to be performed.

If the automatic image orientation changing processing has not been executed yet, the control unit 1001 determines whether or not to execute the automatic coordinate direction changing processing according to another instruction to change the image orientation which the client 3000 transmitting the instruction to change the image orientation has previously transmitted before transmitting the instruction to change the image orientation.

Here, the automatic coordinate direction changing processing is performed when the communication unit 1004 receives the instruction to change the image orientation, as with Embodiment 1. That is, if the automatic coordinate direction changing processing is executed, the communication unit 1004 has already received the instruction to change the image orientation. If the automatic coordinate direction changing processing has not been executed, the communication unit 1004 has not received the instruction to change the image orientation yet.

The control unit 1001 determines whether the automatic coordinate direction changing processing is under execution or not by referring to the memory 1002. As with Embodiment 1, the memory 1002 stores information representing whether the automatic coordinate direction changing processing has been performed or not. Furthermore, the memory 1002 stores information representing which client 3000 among the clients 3000 connected to the capturing apparatus 2000 via the network 3020 has issued the image orientation changing processing and, in response thereto, the automatic coordinate direction changing processing has been executed. In the case of performing the automatic coordinate direction changing processing, the control unit 1001 performs control of storing, in the memory 1002, information representing which client 3000 has issued the instruction to change the image orientation and, in response thereto, the automatic coordinate direction changing processing is to be performed.

If the automatic coordinate direction changing processing is under execution, the control unit 1001 transmits the error response to the instruction to change the image orientation that is currently being received. That is, if the communication unit 1004 has already received the instruction to change the image orientation from the client 3000 that is a source of the currently receiving instruction to change the image orientation, the control unit 1001 transmits the error response to the currently receiving image orientation instruction.

As described above, if the control unit 1001 consecutively receives the instructions to change the image orientation, this unit 1001 performs control of executing only the first received instruction to change the image orientation. Thus, the capturing apparatus 2000 of this embodiment can prevent the instruction to change the image orientation from being redundantly executed owing to the instruction from the identical client 3000.

If the automatic coordinate direction changing processing is not under execution, the control unit 1001 reads the argument of the received instruction to change the image orientation, and changes the image orientation parameter in the memory 1002. Furthermore, the control unit 1001 performs the automatic coordinate direction changing processing.

As described above, when the automatic coordinate direction changing processing is started, the control unit 1001 stores, in the memory 1002, information representing that the automatic coordinate direction changing processing has been executed. The information indicating that the automatic coordinate direction changing processing is under execution can be stored in the memory 1002 as described in Embodiment 1.

The control unit 1001 uses the timer 1005 to activate a timer for the client having transmitted the instruction to change the image orientation that is received this time.

Next, the control unit 1001 transmits the normal response to the executed instruction to change the image orientation, to the client 3000 having transmitted the instruction to change the image orientation.

Thus, upon reception of the instruction to change the image orientation, the control unit 1001 of this embodiment executes the instruction to change the image orientation and the instruction to change the coordinate direction. The instruction to change the image orientation is the instruction to change the image orientation received by the communication unit 1004. The instruction to change the coordinate direction is the instruction executed by the control unit 1001 performing the automatic coordinate direction changing processing.

In contrast, if the automatic image orientation changing processing is under execution, the control unit 1001 deletes the timer for the client having transmitted the instruction to change the image orientation.

The control unit 1001 then reads the argument of the received instruction to change the image orientation, and changes the image orientation parameter in the memory 1002. The control unit 1001 finishes the automatic image orientation changing processing.

Next, the control unit 1001 transmits a normal response to the executed instruction to change the image orientation, to the client 3000 having transmitted the instruction to change the image orientation.

Thus, when the control unit 1001 receives the instruction to change the image orientation in a state where the automatic image orientation changing processing is under execution, this unit 1001 finishes the automatic image orientation changing processing and executes the instruction to change the image orientation and the instruction to change the coordinate direction. The instruction to change the image orientation is the instruction to change the image orientation received by the communication unit 1004. The instruction to change the coordinate direction is the instruction to change the coordinate direction received by the communication unit 1004 before the automatic image orientation changing processing is executed.

Thus, the capturing apparatus 2000 can output the captured image (captured image 1072 in FIG. 6) with the changed image orientation, and change the image capturing range based on the changed coordinates (coordinates 2083 in FIG. 8). Accordingly, the captured image is output in the state where the image orientation (normal orientation/inverted orientation) matches with the coordinate direction (normal orientation/inverted orientation), thereby allowing the image capturing range to be changed.

Thus, the capturing apparatus 2000 can execute the instruction to change the image orientation while making the shooting direction match with the coordinate direction.

In this embodiment, the control unit 1001 determines whether or not one of the automatic image orientation changing processing and the automatic coordinate direction changing processing is the processing in response to the instruction from the client 3000 having transmitted the instruction to change the image orientation. Thus, when the control unit 1001 receives the instruction to change the image orientation from the client 3000, this unit 1001 can execute the instruction to change the image orientation and the instruction to change the coordinate direction. Accordingly, control of executing both of the instructions while making the image orientation match with the coordinate direction can be performed on each client 3000.

Instead, the control unit 1001 does not necessarily determine whether or not the instruction is issued by the client 3000 having transmitted the instruction to change the image orientation. In this case, the clients 3000 are not discriminated from each other. When a pair of instructions is issued to the capturing apparatus, both of the instructions are executed. Accordingly, even when plural clients 3000 perform one of the instruction to change the image orientation and the instruction to change the coordinate direction, the capturing apparatus 2000 can perform both of the instructions while making the image orientation match with the coordinate direction.

Thus, upon reception of the instruction to change the coordinate direction, the control unit 1001 of this embodiment executes the instruction to change the coordinate direction and the instruction to change the image orientation. The instruction to change the coordinate direction is the instruction to change the coordinate direction received by the communication unit 1004. The instruction to change the image orientation is the instruction executed by the control unit 1001 performing the automatic image orientation changing processing.

In contrast, if the automatic coordinate direction changing processing is under execution, the control unit 1001 deletes the timer for the client having transmitted the instruction to change the coordinate direction.

The control unit 1001 then reads the argument of the received instruction to change the coordinate direction, and changes the coordinate direction parameter in the memory 1002. The control unit 1001 finishes the automatic coordinate direction changing processing.

Next, the control unit 1001 transmits a normal response to the executed instruction to change the coordinate direction, to the client 3000 having transmitted the instruction to change the coordinate direction.

Thus, when the control unit 1001 receives the instruction to change the coordinate direction in the state where the automatic coordinate direction changing processing is under execution, this unit 1001 finishes the automatic coordinate direction changing processing, and executes the instruction to change the coordinate direction and the instruction to change the image orientation. The instruction to change the coordinate direction is the instruction to change the coordinate direction received by the communication unit 1004. The instruction to change the image orientation is the instruction to change the image orientation received by the communication unit 1004 before execution of the automatic coordinate direction changing processing.

Accordingly, the capturing apparatus 2000 can output the captured image (captured image 1072 in FIG. 6) with the changed image orientation, and change image capturing range based on the changed coordinates (coordinates 2083 in FIG. 8). Accordingly, the captured image can be output in the state where the image orientation (normal orientation/inverted orientation) matches with the coordinate direction (normal orientation/inverted orientation), thereby allowing the image capturing range to be changed.

Thus, the capturing apparatus 2000 can execute the instruction to change the image orientation in the state where the shooting direction always matches with the coordinate direction.

Next, the coordinate direction changing processing will be described. In the coordinate direction changing processing, processing analogous to the image orientation changing processing is performed.

First, the control unit 1001 refers to the memory 1002, and determines whether or not the automatic coordinate direction changing processing is executed according to the instruction to change the image orientation received from the client 3000 having transmitted the instruction to change the coordinate direction.

If the automatic coordinate direction changing processing is not executed, the control unit 1001 determines whether to execute the automatic image orientation changing processing or not.

If the automatic image orientation changing processing is under execution, the control unit 1001 transmits an error response to the currently receiving instruction to change the coordinate direction. That is, if the communication unit 1004 has already received the instruction to change the coordinate direction, the control unit 1001 transmits the error response to the currently receiving coordinate direction instruction.

As described above, if the control unit 1001 consecutively receives the instructions to change the coordinate direction, this unit 1001 performs control of executing only the first received instruction to change the coordinate direction. Thus, the capturing apparatus 2000 of this embodiment can prevent the instruction to change the coordinate direction from being redundantly executed.

If the automatic image orientation changing processing is not under execution, the control unit 1001 reads the argument of the received instruction to change the coordinate direction and changes the coordinate direction parameter in the memory 1002. Furthermore, the control unit 1001 performs the automatic image orientation changing processing.

The control unit 1001 then uses the timer 1005, and activates a timer for the client having transmitted the instruction to change the coordinate direction received this time.

Next, the control unit 1001 transmits a normal response to the executed instruction to change the coordinate direction, to the client 3000 having transmitted the instruction to change the coordinate direction.

In this embodiment, the control unit 1001 determines whether or not one of the automatic image orientation changing processing and the automatic coordinate direction changing processing is the processing executed in response to the instruction from the client 3000 having transmitted the instruction to change the coordinate direction. Accordingly, upon reception of the instruction to change the coordinate direction from the client 3000, the control unit 1001 can execute the instruction to change the image orientation and the instruction to change the coordinate direction. Thus, the control unit 1001 can perform control of executing both of the instructions while making the image orientation match with the coordinate direction on each client 3000.

Instead, the control unit 1001 does not necessarily determine whether or not the instruction is issued by the client 3000 having transmitted the instruction to change the coordinate direction. In this case, the control unit 1001 does not discriminate the clients 3000 from each other. When a pair of instructions is issued to the capturing apparatus, both of the instructions are executed. Accordingly, even when a plurality clients 3000 perform one of the instruction to change the image orientation and the instruction to change the coordinate direction, the capturing apparatus 2000 can perform both of the instructions while making the image orientation match with the coordinate direction.

This configuration prevents only one of the instruction to change the coordinate direction and the instruction to change the image orientation from being executed. Accordingly, the coordinate direction and the image orientation can be prevented from being mismatched with each other.

According to the operation, the capturing apparatus 2000 can output the captured image (captured image 1072 in FIG. 6) with the changed image orientation, and change image capturing range, based on the changed coordinates (coordinates 2083 in FIG. 8). Accordingly, the capturing apparatus 2000 can output the captured image in the state where the image orientation (normal orientation/inverted orientation) matches with coordinate direction (normal orientation/inverted orientation), and change the image capturing range.

According to the processing, the capturing apparatus 2000 can prevent change in only one of the image orientation and the coordinate direction of the range in which the image can be captured. The capturing apparatus 2000 can appropriately process the instructions to change the image orientation and the instructions to change the coordinate direction received from plural clients 3000, and return normal/error responses.

In this embodiment, the processing in the case where the plural clients 3000 are connected to the capturing apparatus 2000 via the network 3020 has been described. In this embodiment, the processing in the case of issuing one of the normal response representing that an instruction from the client 3000 has been normally executed and the error response representing that the instruction has not been executed in response to the instruction has been described. The processing is not limited to the case of application to the capturing apparatus having the function, which is called digital PTZ function, as with this embodiment. The processing is also applicable to the capturing apparatus described in Embodiment 1.

Embodiment 3

Operation According to ONVIF

In this embodiment, the description will be made such that the instruction to change the image orientation, the instruction to change the coordinate direction, the instruction for a query about the image orientation changing capability, and the instruction for a query about the coordinate direction changing capability may be defined based on, for instance, the ONVIF standard. According to the ONVIF standard, data types used for the instruction are defined using the XML Schema Definition language (hereinafter, sometimes called XSD), and the instruction is described using XML. A capturing apparatus of this embodiment serves as a Network Video Transmitter (hereinafter, sometimes called NVT) in the ONVIF standard.

Hereinafter, referring to FIG. 14, type definition of the XSD used in this embodiment will be described. FIG. 14A is a diagram illustrating the Video Source Configuration Extension type used in the instruction to change the image orientation, and the instruction for a query about the image orientation changing capability. In FIG. 14A, a first field is a Rotate field and the type is the Rotate type. In the Video Source Configuration Extension type, the last field is the Extension field, and the VideoAourceCOnfigurationExtensiuon2 type, which is not illustrated.

FIG. 14B is a diagram illustrating the definition of the Rotate type. The Rotate type includes the Mode field, the Degree field, and the Extension field. A first field is the Mode field. This field is represented as the Rotate Mode type. The Degree field is represented as int, which is one of integer types defined in the XML. The Extension field is the Rotate Extension type. In this embodiment, the Degree field and the Extension field may be omitted. The Degree field represents the rotational angle of the image orientation. In the case of omission thereof, it is configured to represent a rotational angle of 180 degrees.

FIG. 14C is a diagram illustrating the definition of the Rotate Mode type. The Rotate Mode type is a string type whose value is limited. It is represented that values capable of being represented by the Rotate Mode type are OFF, ON, and AUTO.

FIG. 14D is a diagram illustrating the configuration of the PT Control Direction type, which is used in the instruction to change the coordinate direction, and the instruction for a query about the coordinate direction changing capability. The PT Control Direction type includes an EFlip field (not illustrated), a Reverse field and an Extension field (not illustrated). The types of the EFlip field, the Reverse field, and the Extension field are EFlip type, Reverse type, and PT Control Direction Extension type, respectively.

FIG. 14E is a diagram illustrating the definition of the Reverse type. The Reverse type includes a Mode field of the Reverse Mode type, as a configurational element.

FIG. 14F is a diagram illustrating the definition of the Reverse Mode type. The Reverse Mode type is a string type whose value is limited. It is represented that values capable of being represented by the Reverse Mode type are OFF, ON, AUTO and Extended.

The client 3000 of this embodiment transmits the Get Compatible Video Source Configuration instruction, the Get Profile instruction, the Get Profiles instruction, Get Video Source Configuration instruction, and the Get Video Source Configurations instruction defined in the ONVIF, as the instructions for queries about the image orientation changing capabilities, to the capturing apparatus of this embodiment. In the case where the image orientation changing capabilities exist for the respective instructions for queries about the image orientation changing capabilities, the capturing apparatus of this embodiment sets the value of the Mode field in the Rotate field to AUTO, and returns the Get Compatible Video Source Configurations Response, Get Profile Response, Get Profile Response, Get Video Source Configuration Response, and Get Video Source Configurations Response, for instance. These operations can notify the client 3000 that, in the capturing apparatus of this embodiment, only automatic change exists as an alternative of changing the image orientation.

Subsequently, the client 3000 transmits the Set Configuration instruction as the instruction to change the coordinate direction. A PTZ Configuration field including an Extension field is incorporated in the Set Configuration instruction, which is then transmitted. The Extension field includes a PT Control Direction field. The PT Control Direction field includes a Reverse field. The Reverse field has the Reverse type. The Reverse field includes the Mode field of the Reverse Mode type. The Mode field designates ON and OFF of the instruction to change the coordinate direction of this embodiment. FIG. 15A is a diagram illustrating the configuration of the instruction to change the coordinate direction (Set Configuration instruction) in the ON case.

As described above, upon reception of the instruction to change the coordinate direction (Set Configuration instruction), the capturing apparatus of this embodiment changes the image orientation, which is subjected to automatic changing, while changing the coordinate direction. According to these operations, the capturing apparatus of this embodiment can output the captured image in the state where the image orientation (normal orientation/inverted orientation) matches with the coordinate direction (normal orientation/inverted orientation), and change the image capturing range. Furthermore, according to these operations, the capturing apparatus of this embodiment can prevent the coordinate direction (normal orientation/inverted orientation) and the image orientation (normal orientation/inverted orientation) of the captured image from being mismatched with each other.

In the example of the capturing apparatus, the configuration is adopted that changes the coordinate direction and the image orientation when the instruction to change the coordinate direction (Set Configuration instruction) is received. Instead, a configuration may be adopted that changes the image orientation and the coordinate direction when the instruction to change the image orientation is received.

The client 3000 of this embodiment transmits, for instance, a Get Configuration instruction, a Get Configuration Options instruction, and a Get Configurations instruction, which are defined in ONVIF, as the instruction for a query about the coordinate direction changing capability, to the capturing apparatus of this embodiment. In this embodiment, it is configured such that, in response to the instruction for a query about the coordinate direction changing capability, the value of the Mode field in the Reverse field is set to AUTO and a response is issued. In this case, a Get Configuration Response, a Get Configuration Options Response and a Get Configurations Response whose values of the Mode fields in the Reverse fields are AUTO are transmitted from the capturing apparatus to the client 3000.

According to these operations, the capturing apparatus of this embodiment can notify the client 3000 that the alternative of changing the coordinate direction is only automatic changing.

Subsequently, the client 3000 transmits a Set Video Source Configuration instruction, as the instruction to change the image orientation. The Set Video Source Configuration instruction includes Configuration field including the Extension field therein. The Extension field is data of the Video Source Configuration Extension type, and includes the Rotate field. The Rotate field is data of the Rotate type, and can include a Mode field of the Rotate Mode type, a Degree field of int type, and an Extension field of the Rotate Extension type. As described above, the Degree field and the Extension field may be omitted. In the Set Video Source Configuration instruction, the Mode field designates ON and OFF of the instruction to change the image orientation. FIG. 15B is a diagram illustrating an example of a configuration of the instruction to change the image orientation (Set Video Source Configuration instruction) whose value of the Mode field is set to OFF.

As described above, upon reception of the instruction to change the image orientation (Set Video Source Configuration instruction), the capturing apparatus of this embodiment changes the image orientation while changing the coordinate direction subjected to automatic changing. According to these operations, the capturing apparatus of this embodiment can output the captured image in the state where the image orientation (normal orientation/inverted orientation) matches with the coordinate direction (normal orientation/inverted orientation), and change the image capturing range. Furthermore, according to these operations, the capturing apparatus of this embodiment can prevent can prevent the coordinate direction (normal orientation/inverted orientation) and the image orientation (normal orientation/inverted orientation) of the captured image from being mismatched with each other.

Other Embodiments

The embodiments are not limited to the above-described configurations, which may be partially changed. In Embodiments 1 to 3, the cases have been described where the interfaces for changing the image orientation and changing the coordinate direction designate one of the normal direction and the inverted direction. However, the interfaces are not limited thereto. Interfaces may be adopted that allow designation on every 90 degrees and allow designation on every one degree.

The exemplary embodiments of the present invention have been described in detail. However, the present invention is not limited to these specific embodiments. Various modifications and variations may be made within the scope of the gist of the present invention, which is claimed.

In each of the embodiments, the description has been made such that the capturing apparatus itself controls this apparatus. Instead, the control apparatus (capturing control apparatus) connected to the capturing apparatus may control the capturing apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132890, filed Jun. 12, 2012 which is hereby incorporated by reference herein in its entirety.

What is claimed is:

1. A processing apparatus comprising:
a processor; and
a memory storing instructions that, when executed by the processor, cause the processing apparatus to:
receive an instruction from an external apparatus;
perform, (A) when a first predetermined instruction, which is either a first instruction, for rotating a captured image, or a second instruction, for changing a coordinate system, is received, both of (1) a first process corresponding to the first instruction for outputting a rotated captured image obtained by a capturing unit and (2) a second process corresponding to the second instruction for changing from (i) a first configuration wherein, in response to receiving an image range changing instruction designating an image capturing direction, the image capturing direction is changed to a direction designated by the image range changing instruction to (ii) a second configuration wherein, in response to receiving the image range changing instruction, the image capturing direction is changed to a direction rotated at a predetermined angle from the direction designated by the image range changing instruction; and
perform, (B) when the other of the first and second instructions is received, none of the first and second processes.

2. The processing apparatus according to claim 1, wherein the memory further stores instructions that, when executed by the processor, cause the processing apparatus to transmit, when the other of the first and second instructions is received, an error response to the external apparatus.

3. The processing apparatus according to claim 2, wherein the error response is a notification of a refusal to perform both the first and second processes.

4. The processing apparatus according to claim 1, wherein the first predetermined instruction is the second instruction, and the other of the first and second instructions is the first instruction.

5. The processing apparatus according to claim 1, wherein the first predetermined instruction is the first instruction, and the other of the first and second instructions is the second instruction.

6. The processing apparatus according to claim 1, wherein the second instruction is an instruction for changing the coordinate system that is used for changing the image capturing direction of the capturing unit from a first coordinate system to a second coordinate system which has been rotated by a certain angle from the first coordinate system.

7. The processing apparatus according to claim 1, wherein the second instruction is an instruction for changing a coordinate system that is used for changing the image capturing direction of the capturing unit from a first coordinate system to a second coordinate system which has been reversed from the first coordinate system.

8. The processing apparatus according to claim 1, wherein the memory further stores instructions that, when executed by the processor, cause the processing apparatus to:
receive a third instruction for setting the processing apparatus such that, when the second instruction is received after the third instruction has been received, the first and the second process are performed, and,
when the second instruction is received after receiving the third instruction, perform the first and the second process.

9. The processing apparatus according to claim 1, wherein the memory further stores instructions that, when executed by the processor, cause the processing apparatus to:
receive a third instruction for setting the processing apparatus such that, when the first instruction is received after the third instruction has been received, the first and the second process are performed, and,
when the first instruction is received after receiving the third instruction, perform the first and the second process.

10. A processing apparatus comprising:
a processor; and
a memory storing instructions that, when executed by the processor, cause the processing apparatus to:
receive an instruction from an external apparatus;
perform, (A) when a first predetermined instruction, which is either a first instruction, for rotating a captured image, or a second instruction, for changing a coordinate system, is received, both of (1) a first process corresponding to the first instruction for outputting a rotated captured image obtained by a capturing unit and (2) a second process corresponding to the second instruction for changing from (i) a first configuration wherein, in response to receiving an image range changing instruction designating an image capturing direction, the image capturing direction is changed to (a) a direction designated by the image range changing instruction to (ii) a second configuration wherein, in response to receiving the image range changing instruction, the image capturing direction is changed to a direction reversing at least one of a pan direction of the capturing unit or a tilt direction of the capturing unit from the direction designated by the image range changing instruction; and
perform, (B) when the other of the first and second instructions is received, none of the first and second processes.

11. The processing apparatus according to claim 10, wherein the memory further stores instructions that, when executed by the processor, cause the processing apparatus to transmit, when the other of the first and second instructions is received, an error response to the external apparatus.

12. The processing apparatus according to claim 10, wherein the first predetermined instruction is the second instruction, and the other of the first and second instructions is the first instruction.

13. The processing apparatus according to claim 10, wherein the first predetermined instruction is the first instruction, and the other of the first and second instructions is the second instruction.

14. A controlling method of a processing apparatus comprising:
receiving an instruction from an external apparatus;
performing, (A) when a first predetermined instruction, which is either a first instruction, for rotating a captured image, or a second instruction, for changing a coordinate system, is received, both of (1) a first process corresponding to the first instruction for outputting a rotated captured image obtained and (2) a second process corresponding to the second instruction for changing from (i) a first configuration wherein, in response to receiving an image range changing instruction designating an image capturing direction, the image capturing direction is changed to a direction designated by the image range changing instruction to (ii) a second configuration wherein, in response to receiving the image range changing instruction, the image capturing direction is changed to a direction rotated at a predetermined angle from the direction designated by the image range changing instruction; and
performing, (B) when the other of the first and second instructions is received, none of the first and second processes.

15. A controlling method of a processing apparatus comprising:
receiving an instruction from an external apparatus;
performing, (A) when a first predetermined instruction, which is either a first instruction, for rotating a captured image, or a second instruction, for changing a coordinate system, is received, both of (1) a first process corresponding to the first instruction for outputting a rotated captured image obtained by a capturing unit and (2) a second process corresponding to the second instruction for changing from (i) a first configuration wherein, in response to receiving an image range changing instruction designating an image capturing direction, the image capturing direction is changed to (a) a direction designated by the image range changing instruction to (ii) a second configuration wherein, in response to receiving the image range changing instruction, the image capturing direction is changed to a direction reversing at least one of a pan direction of the capturing unit or a tilt direction of the capturing unit from the direction designated by the image range changing instruction; and
performing, (B) when the other of the first and second instructions is received, none of the first and second processes.

16. A non-transitory computer-readable recording medium storing a readable program for operating a computer to execute a controlling method of a processing apparatus comprising:
receiving an instruction from an external apparatus;
performing, (A) when a first predetermined instruction, which is either a first instruction, for rotating a captured image, or a second instruction, for changing a coordinate system, is received, both of (1) a first process corresponding to the first instruction for outputting a rotated captured image obtained and (2) a second process corresponding to the second instruction for changing from (i) a first configuration wherein, in response to receiving an image range changing instruction designating an image capturing direction, the image capturing direction is changed to a direction designated by the image range changing instruction to (ii) a second configuration wherein, in response to receiving the image range changing instruction, the image capturing direction is changed to a direction rotated at a predetermined angle from the direction designated by the image range changing instruction; and performing, (B) when the other of the first and second instructions is received, none of the first and second processes.

17. A non-transitory computer-readable recording medium storing a readable program for operating a computer to execute a controlling method of a processing apparatus comprising:

receiving an instruction from an external apparatus;

performing, (A) when a first predetermined instruction, which is either a first instruction, for rotating a captured image, or a second instruction, for changing a coordinate system, is received, both of (1) a first process corresponding to the first instruction for outputting a rotated captured image obtained by a capturing unit and (2) a second process corresponding to the second instruction for changing from (i) a first configuration wherein, in response to receiving an image range changing instruction designating an image capturing direction, the image capturing direction is changed to (a) a direction designated by the image range changing instruction to (ii) a second configuration wherein, in response to receiving the image range changing instruction, the image capturing direction is changed to a direction reversing at least one of a pan direction of the capturing unit or a tilt direction of the capturing unit from the direction designated by the image range changing instruction; and performing, (B) when the other of the first and second instructions is received, none of the first and second processes.

* * * * *